(12) United States Patent
Yamane et al.

(10) Patent No.: US 11,576,018 B2
(45) Date of Patent: Feb. 7, 2023

(54) INFORMATION PROCESSING DEVICE, A RECORDING MEDIUM AND A METHOD THAT ENABLE SHARING, AMONG VEHICLES, OF INFORMATION ABOUT MUSIC THAT IS BEING PLAYED BACK

(71) Applicant: TOYOTA JIDOSHA KABUSHIKI KAISHA, Toyota (JP)

(72) Inventors: Josuke Yamane, Nisshin (JP); Naoya Oka, Nagakute (JP); Ryosuke Yamamoto, Nagoya (JP); Kaori Okuda, Gifu-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/201,787

(22) Filed: Mar. 15, 2021

(65) Prior Publication Data

US 2021/0306826 A1    Sep. 30, 2021

(30) Foreign Application Priority Data

Mar. 24, 2020 (JP) .............................. JP2020-052776

(51) Int. Cl.
*H04W 4/46* (2018.01)
(52) U.S. Cl.
CPC .................... *H04W 4/46* (2018.02)
(58) Field of Classification Search
CPC ........... H04W 4/44; H04W 4/02; H04W 4/40; H04W 4/027; H04W 4/029; H04W 28/0221; H04W 4/024; H04W 4/23; H04W 4/80; H04W 4/021; H04W 4/025; H04W 4/38; H04W 4/46; H04W 4/50; H04N 21/41422; H04N 21/4532; H04N 21/441; H04N 7/185; H04N 21/21805; H04N 21/2187; H04N 21/44218; H04N 21/6587; H04N 7/18; H04N 21/4223; H04N 21/4325; H04N 21/4334; H04N 21/4524; H04N 21/6131; H04N 21/6181; H04N 7/17318; H04N 21/2146; H04N 21/234327; H04N 21/234363; H04N 21/26216;
(Continued)

(56) References Cited

U.S. PATENT DOCUMENTS

2012/0290635 A1* 11/2012 Yuki ..................... G06Q 10/10
709/202
2016/0239257 A1* 8/2016 Jeong ..................... H04B 11/00
(Continued)

FOREIGN PATENT DOCUMENTS

JP     2006-092430 A    4/2006

*Primary Examiner* — Golam Sorowar
(74) *Attorney, Agent, or Firm* — Sughrue Mion, PLLC

(57) ABSTRACT

An information processing device is capable of being placed inside a vehicle. The information processing device includes a controller that is configured to transmit an acquisition request for first information about music that is being played back in a vehicle, in relation to a target vehicle among one or a plurality of vehicles existing in a periphery, receive the first information related to the target vehicle from a predetermined device possessing the first information related to the target vehicle, and output the first information related to the target vehicle. The predetermined device may be a first information processing device that is placed inside the target vehicle, or may be a predetermined server.

5 Claims, 15 Drawing Sheets

(58) Field of Classification Search
CPC ......... H04N 21/4126; H04N 21/41407; H04N 21/42653; H04N 21/4316; H04N 21/4516; G06Q 50/30; G06Q 30/02; G06Q 30/0265; G06Q 30/06; G06Q 10/02; G06Q 10/20; G06Q 20/1235; G06Q 2220/18; G06Q 30/0266; G06Q 30/0267; G06Q 50/10; G06Q 90/00; G06Q 10/06313; G06Q 10/06314; G06Q 10/08; G06Q 10/0832; G06Q 20/18; G06Q 30/0213

See application file for complete search history.

(56) References Cited

U.S. PATENT DOCUMENTS

| | | | |
|---|---|---|---|
| 2019/0001987 A1* | 1/2019 | Kim | B60W 40/02 |
| 2019/0063941 A1* | 2/2019 | Walenty | G01C 21/362 |
| 2019/0387378 A1* | 12/2019 | Willis | H04W 4/02 |
| 2021/0142781 A1* | 5/2021 | Koyanagi | H04N 7/15 |

* cited by examiner

FIG. 12

USER INFORMATION TABLE

| USER ID | VEHICLE NUMBER | ADDRESS |
|---|---|---|
| VH01 | | |
| VH02 | | |
| VH03 | | |
| VH04 | | |
| VH05 | | |

INFORMATION PROCESSING DEVICE, A RECORDING MEDIUM AND A METHOD THAT ENABLE SHARING, AMONG VEHICLES, OF INFORMATION ABOUT MUSIC THAT IS BEING PLAYED BACK

CROSS REFERENCE TO RELATED APPLICATION

This application claims the benefit of Japanese Patent Application No. 2020-052776, filed on Mar. 24, 2020, which is hereby incorporated by reference herein in its entirety.

BACKGROUND

Technical Field

The present disclosure relates to an information processing device and a recording medium.

Description of the Related Art

There is disclosed a technology for automatically playing back a piece of music that suits an ambience of environment and situation of a user (for example, Patent document 1).

CITATION LIST

Patent Document

[Patent document 1] Japanese Patent Laid-Open No. 2006-092430

A subject of the present disclosure is to provide an information processing device and a recording medium that enable sharing, among vehicles, of information about music that is being played back.

SUMMARY

One aspect of the present disclosure is an information processing device capable of being placed inside a vehicle, the information processing device comprising a controller configured to:

transmit an acquisition request for first information about music that is being played back in a vehicle, in relation to a target vehicle among one or a plurality of vehicles existing in a periphery, receive the first information related to the target vehicle from a predetermined device possessing the first information related to the target vehicle, and output the first information related to the target vehicle.

Another aspect of the present disclosure is an information processing device capable of being placed inside a first vehicle, the information processing device comprising a controller configured to:

receive first information about music that is being played back in a vehicle, from one or a plurality of second information processing devices placed inside one or a plurality of second vehicles existing in a periphery, and cause a display device inside the first vehicle to display the first information related to the one or plurality of second vehicles.

Another aspect of the present disclosure is an information processing device comprising one or a plurality of controllers, the controllers each being configured to:

receive, from a first user terminal that is capable of being placed inside a vehicle, an acquisition request for first information about music that is being played back in a vehicle, in relation to a target vehicle among one or a plurality of vehicles existing in a periphery of the first user terminal, acquire the first information related to the target vehicle, and transmit the first information related to the target vehicle to the first user terminal.

According to the present disclosure, information about music that is being played back may be shared among vehicles.

BRIEF DESCRIPTION OF DRAWINGS

FIG. 12 is an example of a user information table that is stored in the user information DB of the server;

DESCRIPTION OF THE EMBODIMENTS

Figure 1:
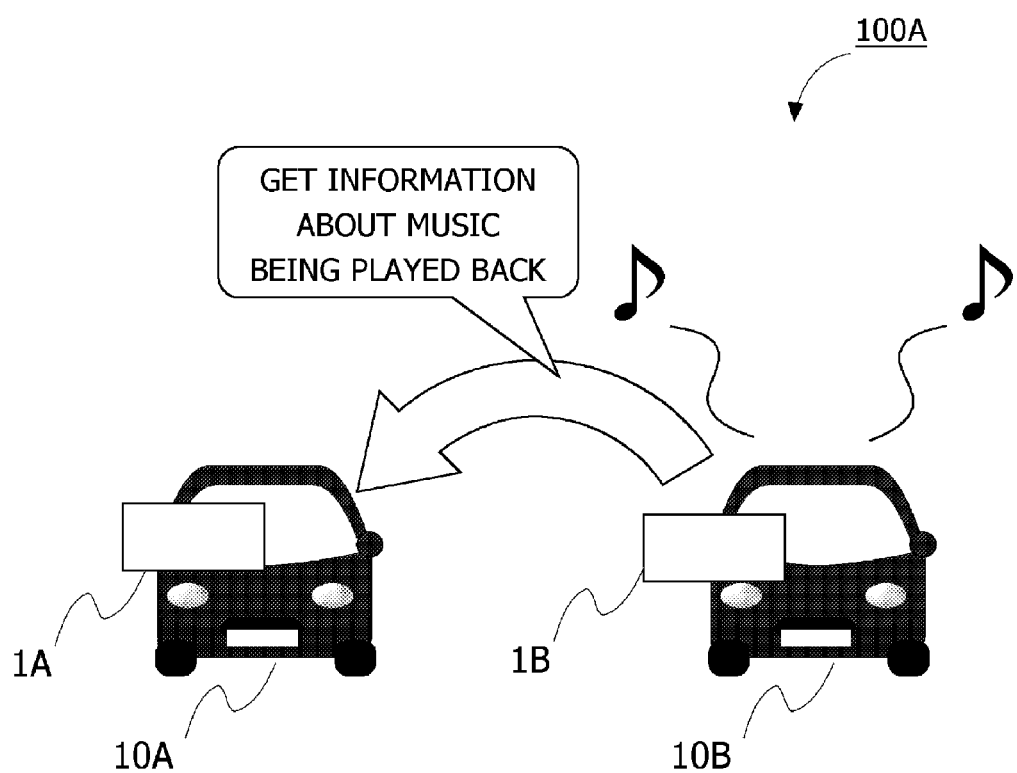
FIG. 1 is a diagram illustrating an example of a system configuration of an in-vehicle-music sharing system according to a first embodiment.

For example, when traveling by a vehicle and one sees occupants on another vehicle that is traveling on an adjacent lane and that is traveling alongside the subject vehicle for a while having a good time, one may want to know what kind of music the occupants in the other vehicle are listening to. However, occupants on a vehicle traveling on an adjacent lane are usually strangers, and it is difficult to obtain information about the music that is being played back in the vehicle.

In the present disclosure, for example, information about music that is being played back in another vehicle that is traveling on an adjacent lane is acquired from a predetermined device possessing information about the music that is being played back in the other vehicle. More specifically, a first aspect of the present disclosure is an information processing device that is capable of being placed inside a vehicle. The information processing device includes a controller. The controller transmits an acquisition request for first information about music that is being played back in a vehicle, in relation to a target vehicle among one or a plurality of vehicles existing in a periphery. Furthermore, the controller receives the first information related to the target vehicle from a predetermined device holding the first information related to the target vehicle, and outputs the first information related to the target vehicle.

The information processing device is an on-board device, for example. The on-board device may be a data communication device or a car navigation system, for example. Alternatively, the information processing device may be a mobile terminal such as a smartphone or a tablet terminal. The controller of the information processing device is a processor such as a central processing unit (CPU), for example. The predetermined device holding the first information related to the target vehicle is an information processing device that is placed inside the target vehicle or a predetermined server, for example.

In the case where the predetermined device is a first information processing device that is placed inside the target vehicle, inter-vehicle communication is performed between the information processing devices, for example. The controller of the information processing device may transmit the acquisition request for the first information related to the target vehicle through inter-vehicle communication, by multicast or broadcast, for example. In this case, when the first information processing device receives the multicast or the broadcast, the first information processing device transmits the first information related to the target vehicle to the information processing device. Accordingly, even in a case where a communication address or the like of the first information processing device placed inside the target vehicle is not known, information about the music that is being played back in the target vehicle may be shared between the information processing device and the first information processing device.

Furthermore, in the first aspect of the present disclosure, the controller of the information processing device may transmit information about the target vehicle, together with the first information related to the target vehicle. Furthermore, the controller may receive, from a second information processing device, information about a target vehicle of the second information processing device and the acquisition request for the first information related to the target vehicle of the second information processing device. Information about a target vehicle is one or a plurality of information pieces that are obtained based on an appearance, such as a vehicle identification number indicated on a license plate, a vehicle type and a vehicle color, for example. In the case where the information about the target vehicle of the second information processing device indicates a first vehicle where the subject information processing device is placed, the controller of the information processing device may transmit, to the second information processing device, the first information related to the first vehicle where the subject information processing device is placed. In this case, the controller may output information indicating that there is the acquisition request for the first information related to the first vehicle where the subject information processing device is placed from the second information processing device. An occupant of the vehicle may thus recognize that an occupant of another vehicle is interested in the music that is being played back in the vehicle, and an opportunity for communication between the occupants of the vehicles may thus be created.

Furthermore, a second aspect of the present disclosure is an information processing device that is capable of being placed inside a first vehicle. The information processing device includes a controller. The controller may receive first information about music that is being played back in a vehicle, from one or a plurality of second information processing devices placed inside one or a plurality of second vehicles existing in a periphery. Furthermore, the controller may cause a display device inside the first vehicle where the subject information processing device is placed to display the first information, in relation to the one or plurality of second vehicles. The information processing device is an on-board device, for example. The on-board device is a data communication device or a car navigation system, for example. Alternatively, the information processing device may be a user terminal such as a smartphone or a tablet terminal. Accordingly, when an occupant wants to know the music that is being played back in a vehicle of a stranger traveling on an adjacent lane, such information may be presented to the occupant even when there is no input of information about the vehicle.

Furthermore, in the second aspect of the present disclosure, the controller of the information processing device may transmit the acquisition request for the first information by multicast or broadcast. In this case, the controller of the information processing device receives the first information about the music that is being played back in the vehicle from a peripheral information processing device that received the acquisition request for the first information. The first information may thus be collected from the second information processing devices in a plurality of vehicles in the periphery, even when information such as a respective communication address is not known.

In the second aspect of the present disclosure, the controller may receive the first information from one or a plurality of second information processing devices at a predetermined timing, and may store the first information in a storage unit. The timing of transmission of the first information is, but not limited to, a timing when playback of music is started or when music that is being played back is changed in the second vehicle where the second information processing device is placed, for example. In the case where a user operation for the acquisition request for the first information is input, the controller may cause the first information stored in the storage to be displayed, in relation to the one or plurality of second vehicles. This enables a response speed to be increased when there is occurrence of the acquisition request for the first information from a user.

Furthermore, in the second aspect of the present disclosure, the controller may receive position information from the one or plurality of second information processing devices, together with the first information, and may identify a positional relationship between the first vehicle and the one or plurality of second vehicles based on the received position information. The controller may further cause the display device to display the positional relationship. The positional relationship between a subject vehicle and another vehicle in the periphery may thus be visually presented to an occupant of the vehicle, and the occupant may easily identify the vehicle where music of interest is being played back.

Furthermore, in the second aspect of the present disclosure, the controller may receive information about volume of the music that is being played back in the vehicle, from the one or plurality of second information processing devices, together with the first information. The controller may cause the display device to display the first information that is received from the second information processing device for which the volume is at or greater than a predetermined value. For example, in a vehicle where occupants are listening to music and having a good time, the volume of the music can be assumed to be relatively high. Accordingly, by sorting out information to be displayed on the display device based on the information about the volume of music inside a vehicle, a target vehicle may be more easily identified.

Furthermore, in the second aspect of the present disclosure, the controller may receive a user operation of selecting one piece of the first information for playback of music, from the first information related to the one or plurality of second vehicles displayed on the display device. In this case, the controller may notify the second information processing device corresponding to the first information selected by the user operation that the first information is selected. It is thus possible to indicate to the second vehicle where the second information processing device is placed that there is an occupant in another vehicle who is interested in the music that is being played back in the second vehicle.

A third aspect of the present disclosure is an information processing device including one or a plurality of controllers. The information processing device according to the third aspect is a server or a roadside device, for example. The server may include a center server or an edge server, for example. The one or a plurality of controllers of the information processing device receive, from a first user terminal that is capable of being placed inside a vehicle, an acquisition request for first information about music that is being played back in a vehicle, in relation to a target vehicle among one or a plurality of vehicles existing in a periphery of the first user terminal. Furthermore, the one or a plurality of controllers acquire the first information related to the target vehicle, and transmit the first information to the first user terminal. The user terminal is a device that is capable of being placed inside a vehicle, such as an on-board device, a smartphone or a tablet terminal, for example. According to the third aspect, information about the music that is being played back in a vehicle in relation to a vehicle in the periphery may be acquired, even in a case where the information processing device is not capable of inter-vehicle communication.

Furthermore, in the third aspect of the present disclosure, the one or a plurality of controllers may each transmit the acquisition request for the first information related to the target vehicle to a second user terminal associated with the target vehicle, in a case where the acquisition request for the first information related to the target vehicle is received from the first user terminal, and may receive the first information related to the target vehicle from the second user terminal. Alternatively, the one or plurality of controllers may receive, at a predetermined timing, the first information from a plurality of user terminals associated with a plurality of vehicles, and may store the first information that is received in a storage. In a case where the acquisition request for the first information related to the target vehicle is received from the first user terminal, the one or plurality of controllers may acquire the first information related to the target vehicle from the storage. In the former case, resources of the storage and the like may be saved. In the latter case, a response speed for a request may be increased.

Furthermore, in the third aspect of the present disclosure, the one or plurality of controllers may each notify the second user terminal associated with the target vehicle that the acquisition request for the first information is received. An occupant of the target vehicle may thus be notified that an occupant of another vehicle is interested in the music that is being played back in the target vehicle.

In the following, an embodiment of the present disclosure will be described with reference to the drawings. The configuration of the embodiment described below is an example, and the present disclosure is not limited to the configuration of the embodiment.

First Embodiment

FIG. 1 is a diagram illustrating an example of a system configuration of an in-vehicle-music sharing system 100A according to a first embodiment. The in-vehicle-music sharing system 100A is a system that provides a service allowing information about music that is being played back in a vehicle to be shared between vehicles, or in other words, a service allowing vehicles to let each other know about music that is being played back. The in-vehicle-music sharing system 100A includes a plurality of on-board devices 1 that are mounted on a plurality of vehicles 10. FIG. 1 illustrates an on-board device 1A mounted on a vehicle 10A and an on-board device 1B mounted on a vehicle 10B for the sake of convenience. Additionally, when not distinguishing between the vehicle 10A and the vehicle 10B, and the on-board device 1A and the on-board device 1B, terms "vehicle(s) 10" and "on-board device(s) 1" will be used.

The vehicle 10 and the on-board device 1 are a vehicle and an on-board device of a user who is registered to receive the service provided by the in-vehicle-music sharing system 100A. The user is an occupant or an owner of the vehicle 10, for example. An occupant of a vehicle may be a driver. In the following, the service that is provided by the in-vehicle-music sharing system 100A will be referred to as an in-vehicle-music sharing service.

An application for receiving the in-vehicle-music sharing service is installed in the on-board device 1. Furthermore, in the first embodiment, the on-board device 1 is assumed to include a function for inter-vehicle communication.

In FIG. 1, the vehicle 10A and the vehicle 10B are assumed to be traveling on adjacent lanes. Furthermore, music is being played back in the vehicle 10B, and a plurality of occupants of the vehicle 10B are enjoying themselves listening to music that is being played back. For example, when an occupant of the vehicle 10A sees the fun inside the vehicle 10B and wonders what music is being played back in the vehicle 10B, the occupant may acquire the information about the music that is being played back in the vehicle 10B by using the in-vehicle-music sharing service.

Figure 2:
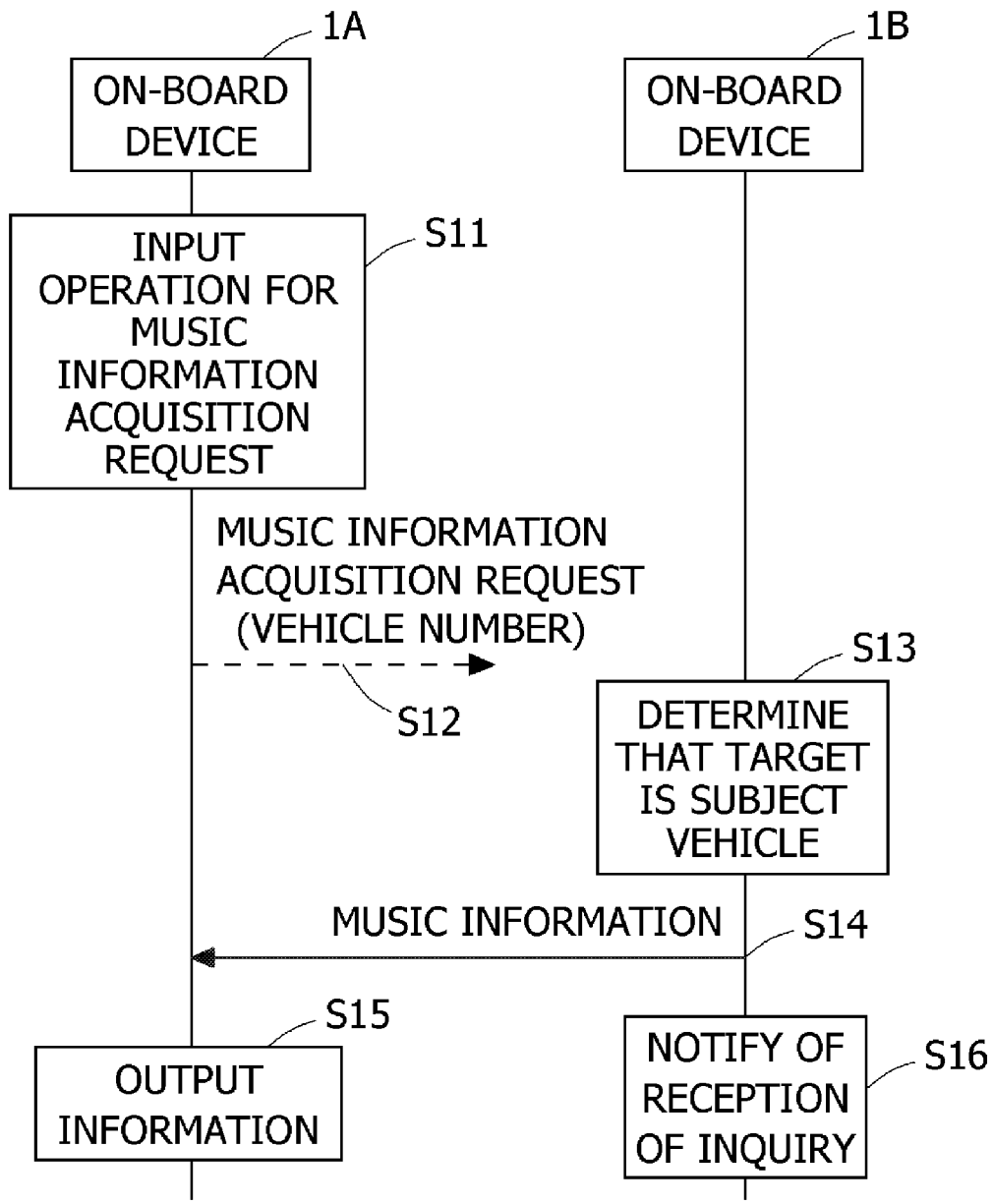
FIG. 2 is a diagram illustrating an example of a sequence of processes, by the in-vehicle-music sharing system according to the first embodiment.

FIG. 2 is a diagram illustrating an example of a sequence of processes, by the in-vehicle-music sharing system 100A according to the first embodiment, for sharing information about music that is being played back in a vehicle. In the following, information about music that is being played back in a vehicle will be referred to simply as music information on a vehicle.

In S11, an occupant of the vehicle 10A inputs, to the on-board device 1A, an operation for an acquisition request for music information. In the following, the acquisition request for the music information on another vehicle will be referred to as a music information acquisition request.

For example, in addition to the operation for the music information acquisition request, input of information about the vehicle 10B as a target vehicle is also performed. Information about the vehicle 10B is information that is obtained based on an appearance of the vehicle 10B, for example. Information that is obtained based on an appearance of the vehicle 10B may be a vehicle registration number indicated on a license plate, a vehicle type, a vehicle color and the like. The vehicle registration number indicated on a license plate is an example of a vehicle identification number. In the following, the vehicle registration number indicated on a license plate will be referred to as vehicle number. In the following, information about a vehicle will be referred to as vehicle information. In the first embodiment, at least the vehicle number is used as the vehicle information. The vehicle information may be input by a user operation, for example. Alternatively, the vehicle information may be obtained as a result of image processing on an image, by receiving input of a captured image that is captured by a camera provided on the vehicle 10 and that includes the vehicle 10 that is the target.

In S12, the on-board device 1A transmits the vehicle information on the vehicle 10B and the music information acquisition request through inter-vehicle communication, by multicast or broadcast. An on-board device 1 existing in the periphery of the vehicle 10A thus receives the vehicle information on the vehicle 10B and the music information acquisition request. The on-board device 1B also receives the vehicle information on the vehicle 10B and the music information acquisition request transmitted from the on-board device 1A.

In S13, the on-board device 1B determines that the vehicle information that is received together with the music information acquisition request indicates the vehicle 10B where the on-board device 1B is mounted, and determines to respond to the music information acquisition request. In S14, the on-board device 1B transmits, as a response to the music information acquisition request, the music information on the vehicle 10B to the on-board device 1A through inter-vehicle communication. The response to the music information acquisition request may be sent by unicast, for example. However, the response to the music information acquisition request may be sent alternatively by multicast or broadcast. For example, the music information on a vehicle is information that allows identification of a piece of music, such as the title of a song and the name of a singer or a songwriter, or International Standard Recording Code.

In S15, the on-board device 1A receives the music information on the vehicle 10B from the on-board device 1B, and causes a display device in the vehicle 10A to display the music information on the vehicle 10B, or downloads the piece of music that is being played in the vehicle 10B to play the piece of music in the vehicle 10A.

In S16, the on-board device 1B notifies an occupant of the vehicle 10B of occurrence of the music information acquisition request for the vehicle 10B from another vehicle, by performing display on a display device, for example.

According to the first embodiment, the on-board device 1A may receive information about the music that is being played back in the vehicle 10B that is traveling on an adjacent lane from the on-board device 1B, and information about music may be shared between the vehicle 10A and the vehicle 10B.

Figure 3:
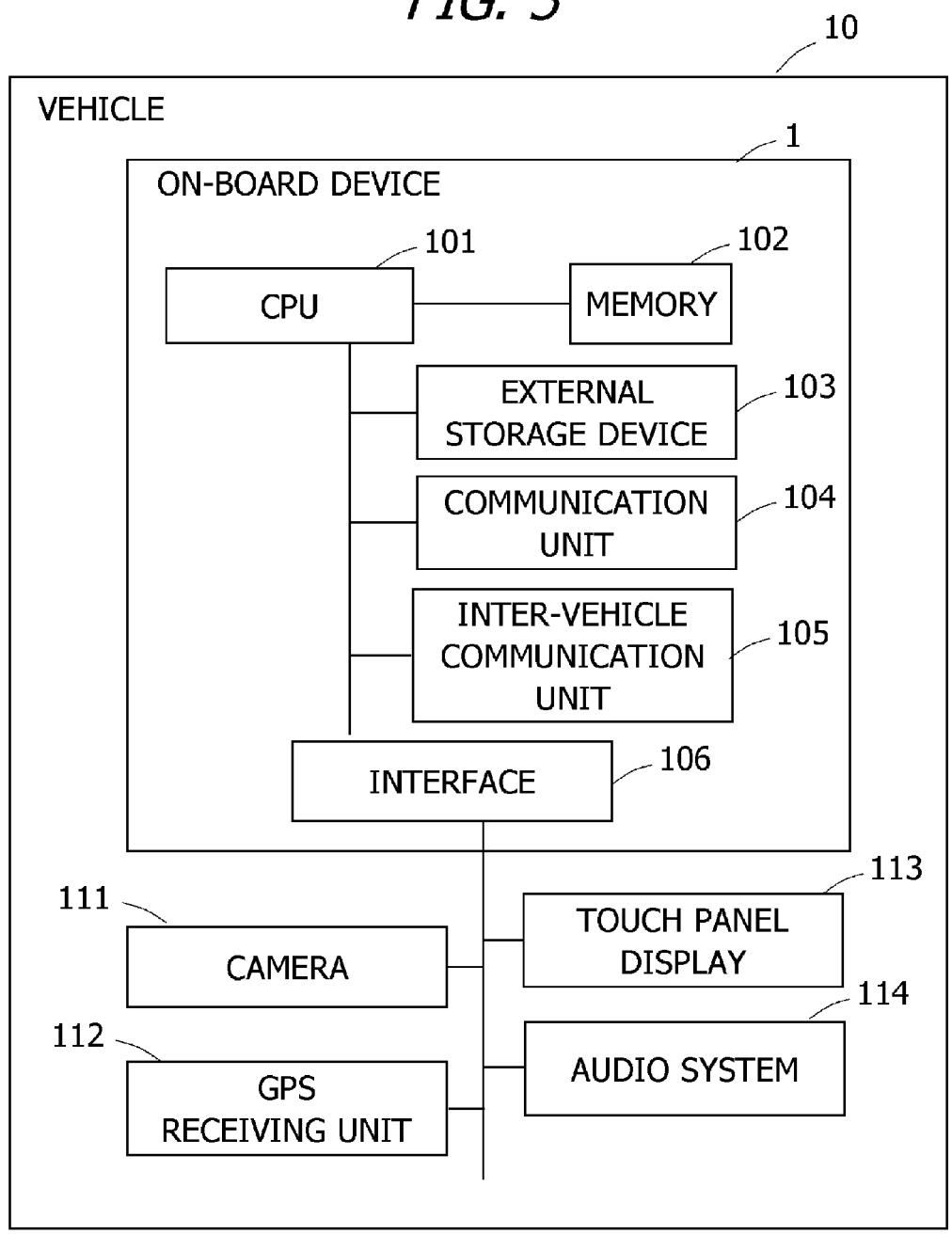
FIG. 3 is a diagram illustrating an example of a hardware configuration of the vehicle and the on-board device.

FIG. 3 is a diagram illustrating an example of a hardware configuration of the vehicle 10 and the on-board device 1.

Additionally, FIG. 3 extracts and illustrates the hardware configuration used for the in-vehicle-music sharing service, among the hardware configuration of the vehicle 10. As the hardware configuration used for the in-vehicle-music sharing service, the vehicle 10 includes the on-board device 1, a camera 111, a global positioning system (GPS) receiving unit 112, a touch panel display 113, and an audio system 114.

The camera 111 is installed facing outside the vehicle 10. For example, an image from the camera 111 is used as the vehicle information on a vehicle 10 that is the target of the music information acquisition request or is used to extract the vehicle information on the vehicle 10.

The GPS receiving unit 112 receives radio waves carrying time signals from a plurality of global positioning satellites orbiting the Earth, and calculates latitude and longitude from a detected signal as position information on the vehicle 10, for example.

The touch panel display 113 receives input of an operation for the music information acquisition request from an occupant of the vehicle 10, and outputs the same to the on-board device 1, for example, and also functions as a display device for displaying information that is input from the on-board device 1. The audio system 114 plays back and outputs audio data input from the on-board device 1, for example.

Next, as hardware configuration, the on-board device 1 includes a CPU 101, a memory 102, an external storage device 103, a communication unit 104, an inter-vehicle communication unit 105, and an interface 106. The memory 102 and the external storage device 103 are each a computer-readable recording medium. The on-board device 1 is an example of "information processing device".

The external storage device 103 stores various programs, and data that is used by the CPU 101 at the time of execution of each program. For example, the external storage device 103 is an erasable programmable ROM (EPROM) or a hard disk drive. Programs held in the external storage device 103 include the operating system (OS), a control program for the in-vehicle-music sharing service, and various other application programs, for example.

The memory 102 is a main memory that provides, to the CPU 101, a storage area and a work area for loading programs stored in the external storage device 103, and that is used as a buffer. The memory 102 includes semiconductor memories such as a read only memory (ROM) and a random access memory (RAM), for example.

The CPU 101 performs various processes by loading the OS and various application programs held in the external storage device 103 into the memory 102 and executing the same. The number of CPUs 101 is not limited to one, and a plurality of CPUs may be provided. The CPU 101 is an example of "controller" of "information processing device".

The communication unit 104 is an interface through which information is input/output from a network. The communication unit 104 is an interface that connects to a wireless network. For example, the communication unit 104 performs 5th generation (5G), long term evolution (LTE) or 3rd generation (3G) mobile communication, or communication according to a wireless communication standard such as WiFi.

The inter-vehicle communication unit 105 directly communicates with another vehicle 10. Direct communication is communication that does not use a relay device. For example, the inter-vehicle communication unit 105 performs communication according to a wireless communication method for inter-vehicle communication, such as dedicated short range communications (DSRC).

The interface 106 connects a hardware structural element in the vehicle 10, other than the on-board device 1, and the on-board device 1. The camera 111, the GPS receiving unit 112, the touch panel display 113, the audio system 114 and the like are connected to the interface 106. Additionally, the hardware configuration of the vehicle 10 is not limited to the one illustrated in FIG. 3.

Figure 4:
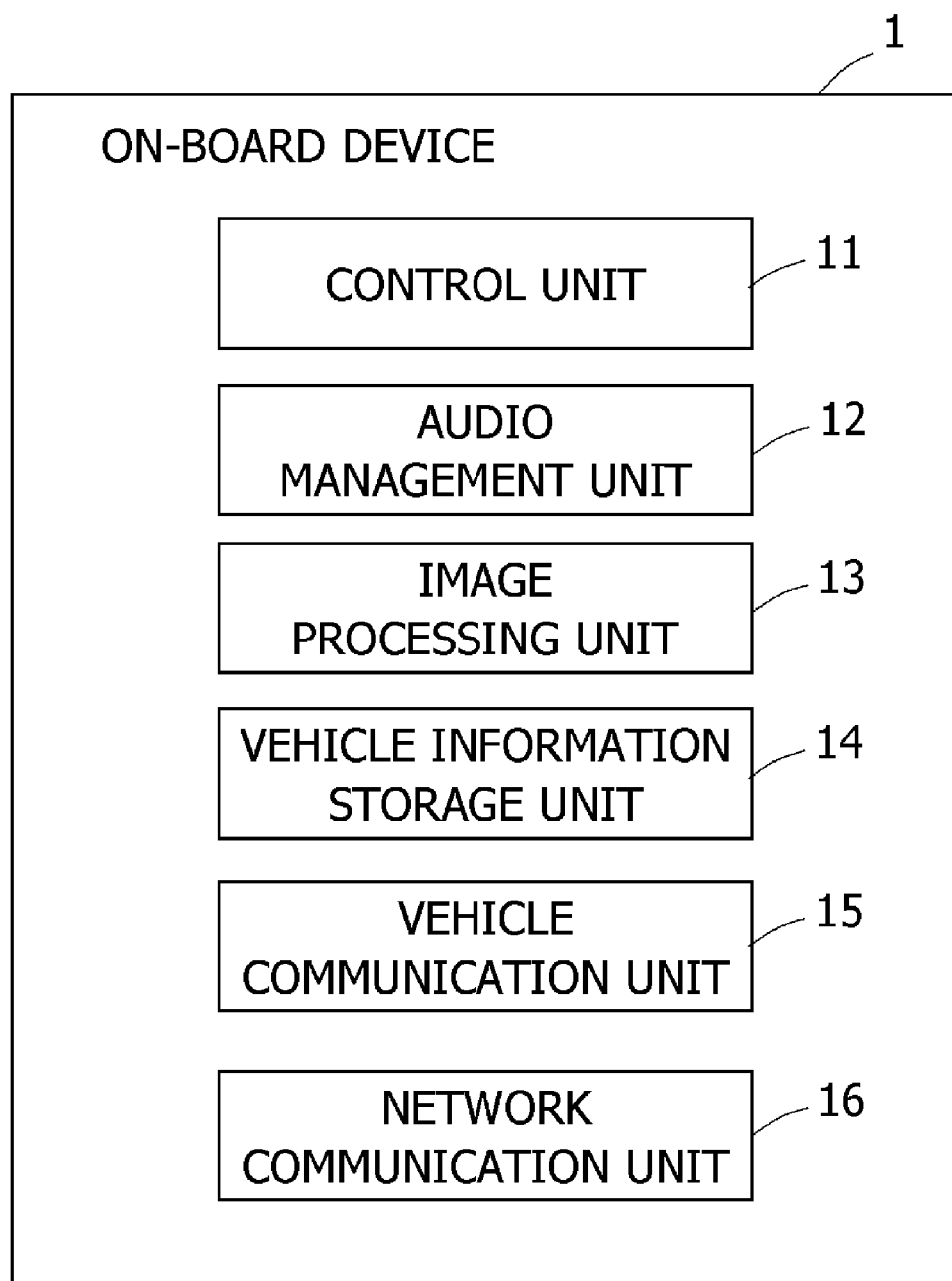
FIG. 4 is a diagram illustrating an example of a functional configuration of the on-board device.

FIG. 4 is a diagram illustrating an example of a functional configuration of the on-board device 1. As functional structural elements, the on-board device 1 includes a control unit 11, an audio management unit 12, an image processing unit 13, a vehicle information storage unit 14, a vehicle communication unit 15, and a network communication unit 16. These functional structural elements are functional structural elements that are implemented by the CPU 101 of the on-board device 1 executing the control program for the in-vehicle-music sharing service, for example.

The vehicle communication unit 15 is an interface to the inter-vehicle communication unit 105. The vehicle communication unit 15 can also be said to be an interface to another vehicle 10. The vehicle communication unit 15 outputs information that is input from the control unit 11 to the inter-vehicle communication unit 105. The vehicle communication unit 15 outputs information that is input from the inter-vehicle communication unit 105 to the control unit 11.

The network communication unit 16 is an interface to the communication unit 104. The network communication unit 16 can also be said to be an interface to a server on a network. The network communication unit 16 outputs information that is input from the control unit 11 to the communication unit 104. The network communication unit 16 outputs information that is input from the communication unit 104 to the control unit 11. Additionally, the network communication unit 16 is not used in the first embodiment, and the network communication unit 16 functions in a third embodiment described later.

The audio management unit 12 manages the audio system 114. For example, the audio management unit 12 causes the audio system 114 to reproduce or stop specified audio data according to an instruction from the control unit 11 or according to an instruction based on a user operation. The audio management unit 12 further manages the music information on the vehicle 10 by the audio system 114, for example. The audio management unit 12 accesses the audio system 114 every predetermined period of time or at a timing of detection of start or stop of reproduction of music data, and acquires the music information, for example. The music information is stored in a predetermined storage area in the memory 102, for example.

The image processing unit 13 performs image processing on an input image according to an instruction from the control unit 11, and extracts information about another vehicle 10 from the image. In the first embodiment, the image processing unit 13 receives, from the control unit 11, a captured image from the camera 111 or input of a captured image from a user terminal that is input by a user operation, for example. Furthermore, in the first embodiment, the image processing unit 13 acquires at least the vehicle number of another vehicle 10, as the vehicle information on the vehicle 10, by performing image processing on the captured image. For example, the image processing unit 13 may acquire information such as the vehicle type and the color of the vehicle body, as the vehicle information on another vehicle 10. Additionally, the vehicle information on another vehicle 10 that is acquired from the captured image is not limited to those mentioned above. The image processing unit 13 outputs the information about another vehicle 10 that is acquired, to the control unit 11.

For example, the vehicle information storage unit 14 is created in a storage area in the external storage device 103. The vehicle information storage unit 14 stores the vehicle information on the vehicle 10 where the subject on-board device 1 is mounted. The vehicle information on the vehicle 10 where the subject on-board device 1 is mounted, that is stored in the vehicle information storage unit 14, may be a vehicle number, a vehicle type, or a vehicle color, for example. However, the vehicle information on the vehicle 10 is not limited to those mentioned above.

The control unit 11 performs control related to the in-vehicle-music sharing service. Specifically, when input of a user operation for the music information acquisition request is received from the touch panel display 113, the control unit 11 performs acquisition of the vehicle information on the vehicle 10 that is the target, for example. The vehicle information on the vehicle 10 that is the target is sometimes input by a user operation, together with the music information acquisition request, but is sometimes not input by the user operation, for example. In the case where the vehicle information on the vehicle 10 that is the target is not input by the user operation, the control unit 11 acquires a captured image from the camera 111, instructs the image processing unit 13 to perform image recognition processing on the captured image, and thus acquires the vehicle information on the vehicle 10 that is the target. Additionally, in the case where the vehicle information on the vehicle 10 that is the target is to be acquired from the captured image from the camera 111, the control unit 11 may, before the image recognition processing, cause the captured image to be displayed and have a user check whether the vehicle 10 that is the target is displayed in the captured image. Furthermore, the control unit 11 may display an image recognition result, and have the user check whether the vehicle information on the vehicle 10 that is the target is acquired.

Next, the control unit 11 transmits the music information acquisition request and the vehicle information on the vehicle 10 that is the target, through the vehicle communication unit 15 and by multicast or broadcast. When the music information on the vehicle 10 that is the target is received in response to the transmission through the vehicle communication unit 15, the control unit 11 causes the touch panel display 113 to display the music information. When an instruction to play back the music is input from the touch panel display 113, the control unit 11 accesses a predetermined server through the network communication unit 16, downloads a piece of music indicated by the music information, and instructs the audio management unit 12 to play back the piece of music.

Moreover, the control unit 11 receives, through the vehicle communication unit 15, the music information acquisition request and information about the vehicle 10 that is the target that are transmitted from another on-board device 1. In this case, the control unit 11 compares the vehicle information that is received and the vehicle information on the vehicle 10 where the subject on-board device 1 is mounted and that is stored in the vehicle information storage unit 14, and determines whether the information pieces match or not. In the case where the vehicle information pieces match, the control unit 11 transmits the music information to the on-board device 1 that is a transmission source of the music information acquisition request that is received, in response to the music information acquisition request.

Moreover, the control unit 11 notifies an occupant of the vehicle 10 of the inquiry about the music information on the vehicle 10 from another on-board device 1, by performing display on the touch panel display 113, for example.

<Flow of Processes>

Figure 5:
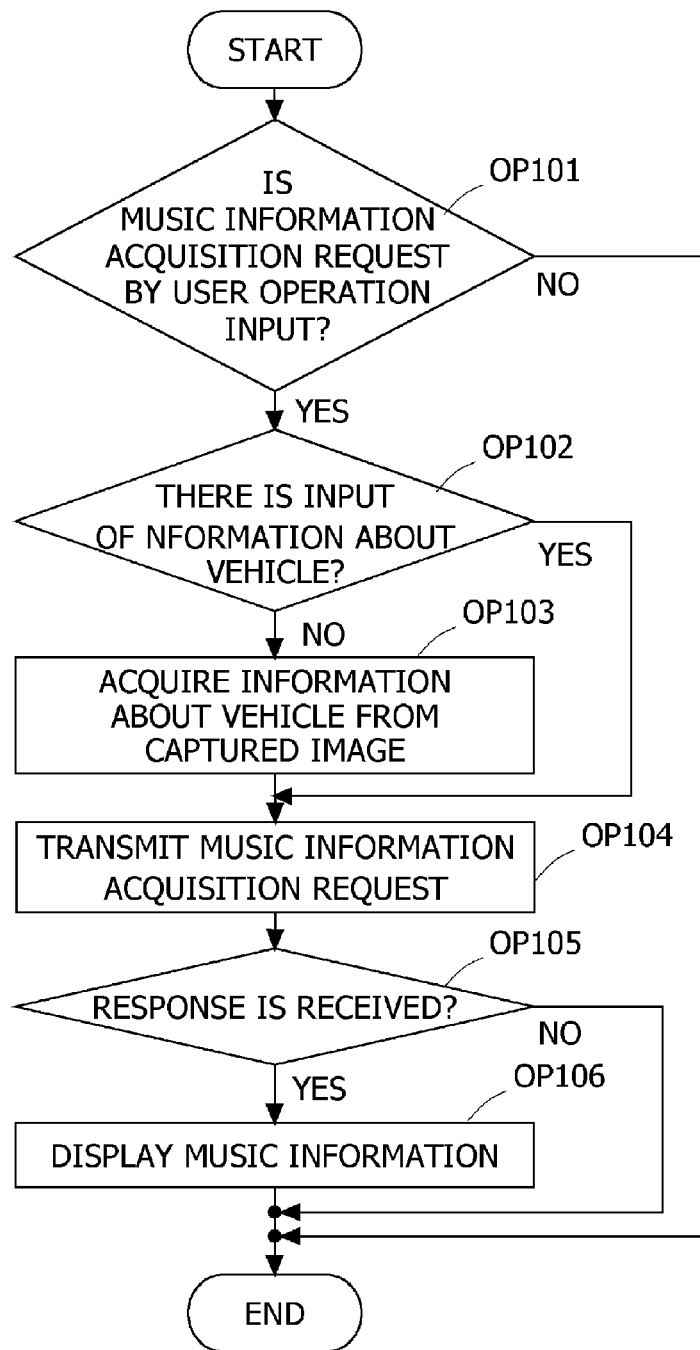
FIG. 5 is an example of a flowchart of a process by the on-board device according to the first embodiment, for acquiring the music information on another vehicle.

FIG. 5 is an example of a flowchart of a process by the on-board device 1 according to the first embodiment, for acquiring the music information on another vehicle 10. The process illustrated in FIG. 5 is repeatedly performed during operation of the on-board device 1, for example. The performer of the process illustrated in FIG. 5 is the CPU 101 of the on-board device 1, but a description will be given taking functional structural elements as the performer for the sake of convenience. The same is true for the following flowcharts.

In OP101, the control unit 11 determines whether or not a music information acquisition request is input by a user operation. In the case where a music information acquisition request is input by a user operation (OP101: YES), the process proceeds to OP102. In the case where a music information acquisition request is not input by a user operation (OP101: NO), the process illustrated in FIG. 5 is ended.

In OP102, the control unit 11 determines whether or not the vehicle information on the vehicle 10 that is the target is input by a user operation. In the case where the vehicle information on the vehicle 10 that is the target is input by a user operation (OP102: YES), the process proceeds to OP104. In the case where the vehicle information on the vehicle 10 that is the target is not input by a user operation (OP102: NO), the process proceeds to OP103.

In OP103, the control unit 11 instructs the image processing unit 13 to perform image processing on a captured image from the camera 111, and acquires the vehicle information on the vehicle 10 that is the target from the captured image.

In OP104, the control unit 11 transmits the music information acquisition request and the vehicle information on the vehicle 10 that is the target, through the vehicle communication unit 15 using inter-vehicle communication and by multicast or broadcast. Additionally, transmission of the music information acquisition request and the vehicle information on the vehicle 10 that is the target may be performed every predetermined period of time until a response is received or may be performed just once.

In OP105, the control unit 11 determines whether or not the music information on the vehicle 10 that is the target is received through the vehicle communication unit 15, as a response to the music information acquisition request. In the case where the music information on the vehicle 10 as the target is received as a response to the music information acquisition request (OP105: YES), the process proceeds to OP106. For example, in the case where the music information on the vehicle 10 that is the target is not received as a response to the music information acquisition request even after a lapse of a predetermined time (OP105: NO), the process illustrated in FIG. 5 is ended.

In OP106, the control unit 11 causes the music information that is received to be displayed on the touch panel display 113. Then, the process illustrated in FIG. 5 is ended. For example, when a playback instruction is input by a user operation for a piece of music that is indicated by the music information displayed on the touch panel display 113, playback of the piece of music is performed.

Figure 6:
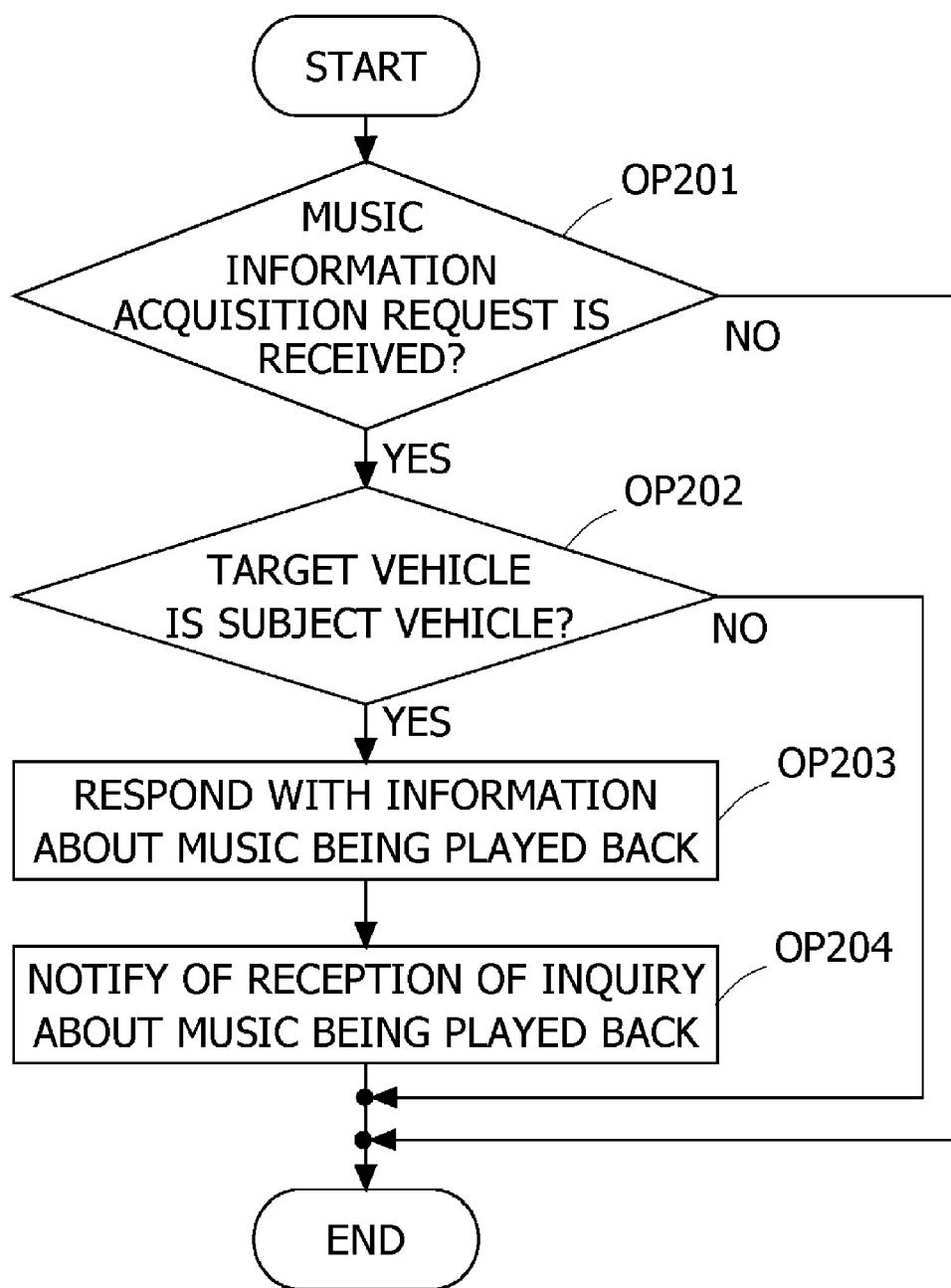
FIG. 6 is an example of a flowchart of a process by the on-board device according to the first embodiment, for a case where the music information acquisition request is received from another on-board device.

FIG. 6 is an example of a flowchart of a process by the on-board device 1 according to the first embodiment, for a case where the music information acquisition request is received from another on-board device 1. The process illustrated in FIG. 6 is repeatedly performed during operation of the on-board device 1, for example.

In OP201, the control unit 11 determines whether or not a music information acquisition request is received through the vehicle communication unit 15. In the case where a music information acquisition request is received (OP201: YES), the process proceeds to OP202. In the case where a music information acquisition request is not received (OP201: NO), the process illustrated in FIG. 6 is ended. The vehicle information on the vehicle 10 that is the target is also received together with the music information acquisition request.

In OP202, the control unit 11 determines whether or not the vehicle that is the target of the music information acquisition request is the vehicle 10 where the subject on-board device 1 is mounted, by determining whether or not the vehicle information that is received matches the vehicle information on the vehicle 10 where the subject on-board device 1 is mounted. In the case where the vehicle that is the target of the music information acquisition request is the vehicle 10 where the subject on-board device 1 is mounted (OP202: YES), the process proceeds to OP203. In the case where the vehicle that is the target of the music information acquisition request is not the vehicle 10 where the subject on-board device 1 is mounted (OP202: NO), the process illustrated in FIG. 6 is ended.

In OP203, the control unit 11 acquires the music information on the vehicle 10 where the subject on-board device 1 is mounted from the audio management unit 12, and transmits the music information as the response for the music information acquisition request, through the vehicle communication unit 15 to the on-board device 1 that is the transmission source of the music information acquisition request.

In OP204, the control unit 11 notifies an occupant of reception, from another on-board device 1, of an inquiry about the piece of music that is being played back in the vehicle 10, by displaying a message on the touch panel display 113, for example. Then, the process illustrated in FIG. 6 is ended.

Operation and Effects of First Embodiment

According to the first embodiment, in a case where an occupant of a vehicle 10 wants information about music that is being played back in another vehicle 10 in the periphery, the information about the music that is being played back in the vehicle 10 that is the target may be acquired from the on-board device 1 that is mounted on the vehicle 10 that is the target, through inter-vehicle communication. When the acquired information about music is displayed on the touch panel display 113 in the vehicle 10 and the occupant of the vehicle 10 instructs playback of the music, the music may be played back in the vehicle 10. Communication between the occupant of the vehicle 10 that is the target and the occupant of the subject vehicle 10 may thus be promoted when the occupants meet at a parking lot on the way or at a destination, for example, with the music that is played back in the vehicle as a tool for starting conversation.

Furthermore, in the first embodiment, processes are performed by inter-vehicle communication between two on-board devices 1, and there is no intervention by a third-party device, and a response speed for the music information acquisition request may be increased.

Furthermore, in the first embodiment, the on-board device 1 that received the music information acquisition request and transmitted the music information as a response notifies the occupant of reception of the inquiry from the other on-board device 1 about the music that is being played back. The occupant may thus become aware that the occupant in the other vehicle is interested in the music that is being played back in the vehicle, and communication between the occupants of the two vehicles 10 may be promoted. Additionally, notification, by the on-board device 1 receiving the music information acquisition request, about reception of an inquiry from another on-board device 1 about music that is being played back is optional, and execution or non-execution may be set by the occupant, for example.

Second Embodiment

Figure 7:
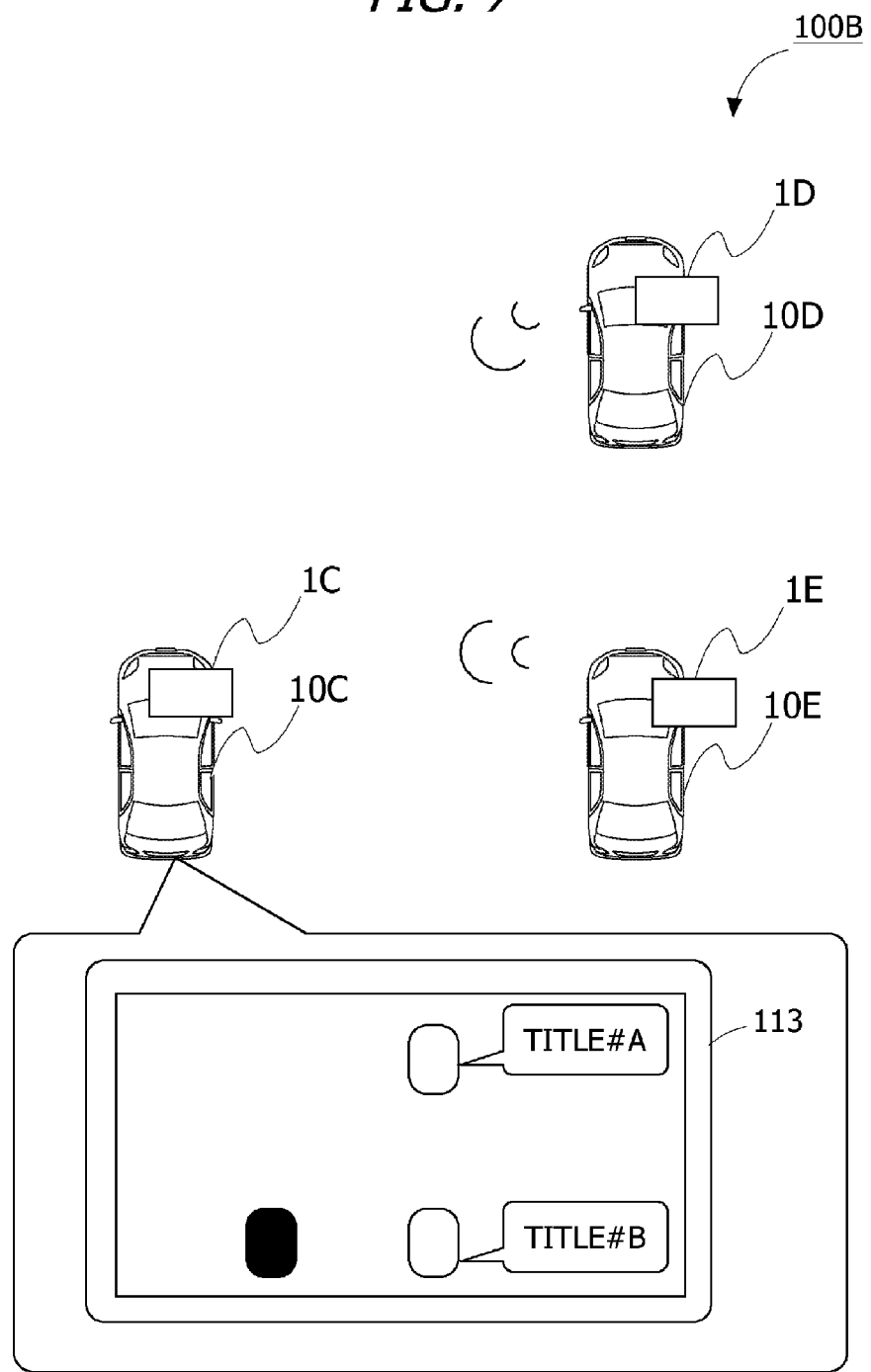
FIG. 7 is a diagram illustrating an example of a system configuration of an in-vehicle-music sharing system according to a second embodiment.

FIG. 7 is a diagram illustrating an example of a system configuration of an in-vehicle-music sharing system 100B according to a second embodiment. Additionally, in the second embodiment, a description overlapping that of the first embodiment will be omitted. The in-vehicle-music sharing system 100B according to the second embodiment includes a plurality of on-board devices 1.

In the second embodiment, an on-board device 1C collects, through inter-vehicle communication, the vehicle information and the music information from each of an on-board device 1D and an on-board device 1E mounted on a vehicle 10D and a vehicle 10E in the periphery. In the second embodiment, the vehicle information at least includes the position information on the vehicle 10.

The on-board device 1C acquires the positional relationship of the vehicle 10C to each of the vehicle 10D and the vehicle 10E based on the acquired vehicle information. The on-board device 1C causes the touch panel display 113 to display a screen where icons indicating the vehicles are arranged according to the acquired positional relationships and the music information on each vehicle is indicated.

In FIG. 7, on a display screen on the touch panel display 113 of the vehicle 10C, an icon indicating the vehicle 10C are illustrated in black to indicate that the vehicle 10C is the subject vehicle, and icons indicating the vehicles 10D and 10E are illustrated in white. For example, in the case where the vehicle that is the target from which an occupant of the vehicle 10C wants the music information is the vehicle 10E, the occupant of the vehicle 10C may acquire information about the music that is being played back in the vehicle 10E that is the target by looking at the display screen on the touch panel display 113.

In the second embodiment, the hardware configurations of the vehicle 10 and the on-board device 1 are the same as those in the first embodiment. Furthermore, the functional configuration of the on-board device 1 according to the second embodiment is the same as that in the first embodiment. In the second embodiment, when a user operation for the music information acquisition request is input, the control unit 11 of the on-board device 1 transmits the music information acquisition request through the vehicle communication unit 15, by multicast or broadcast. The music information acquisition request is received by another vehicle 10 that is present within a predetermined range from the vehicle 10.

When the music information acquisition request is received, the control unit 11 of the other on-board device 1 transmits, as a response, the vehicle information and the music information on the vehicle 10 where the subject on-board device 1 is mounted to the on-board device 1 that is the transmission source of the music information acquisition request.

The control unit 11 of the on-board device 1 that is the transmission source of the music information acquisition request acquires the positional relationship between the vehicles 10 based on the vehicle information (including the position information, in the second embodiment) that is received from the other on-board device 1. The control unit 11 causes the touch panel display 113 to display the position information and the music information on each vehicle.

Figure 8:
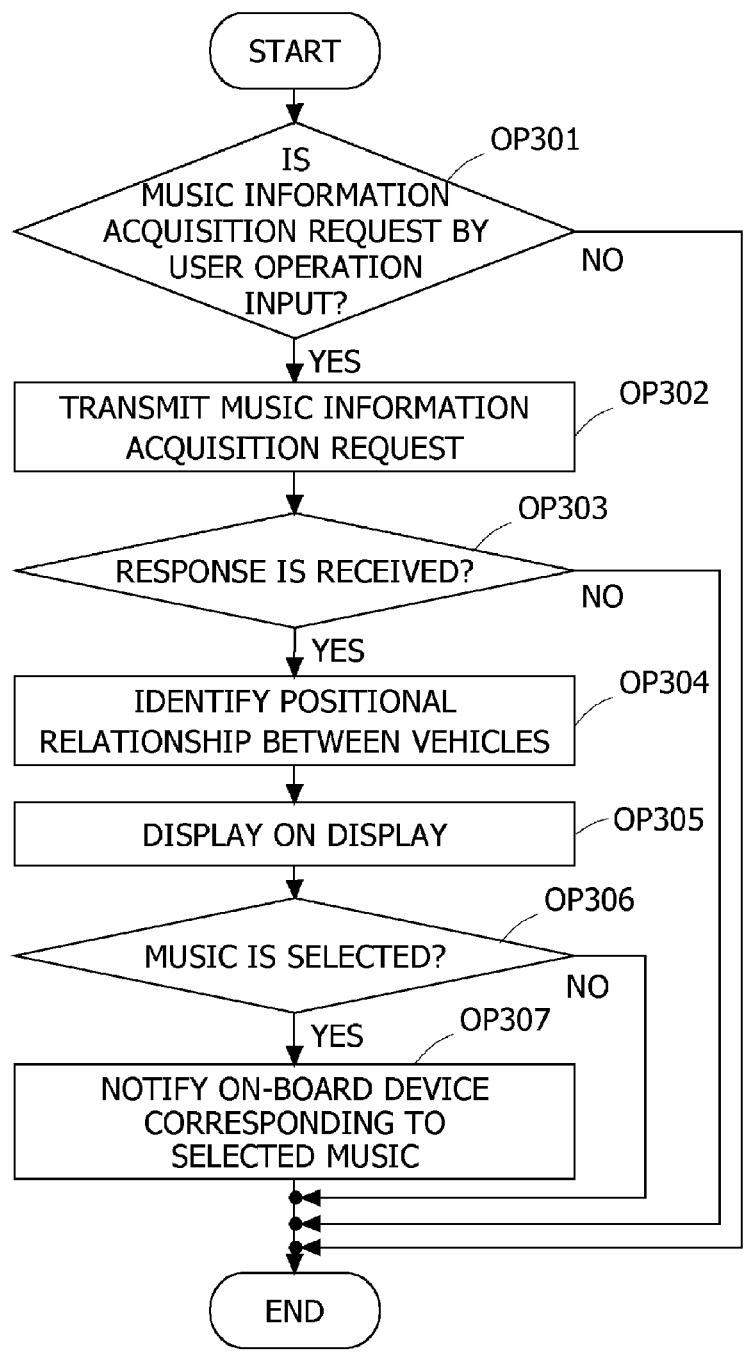
FIG. 8 is an example of a flowchart of a process by the on-board device according to the second embodiment, for a case where input of the music information acquisition request is received.

FIG. 8 is an example of a flowchart of a process by the on-board device 1 according to the second embodiment, for a case where input of the music information acquisition request is received. The process illustrated in FIG. 8 is repeatedly performed during operation of the on-board device 1, for example.

In OP301, the control unit 11 determines whether or not a music information acquisition request is input by a user operation. In the case where a music information acquisition request is input by a user operation (OP301: YES), the process proceeds to OP302. In the case where a music information acquisition request is not input by a user operation (OP301: NO), the process illustrated in FIG. 8 is ended.

In OP302, the control unit 11 transmits the music information acquisition request through the vehicle communication unit 15 using inter-vehicle communication and by multicast or broadcast. Additionally, transmission of the music information acquisition request may be performed every predetermined period of time until a response is received or may be performed just once.

In OP303, the control unit 11 determines whether or not the music information is received, as a response to the music information acquisition request, from another on-board device 1 through the vehicle communication unit 15. Additionally, in OP303, every vehicle information and every music information that are received within a predetermined period of time from transmission of the music information acquisition request are received.

In the case where the music information is received from another on-board device 1 (OP303: YES), the process proceeds to OP304. For example, in the case where the vehicle information and the music information are not received from any on-board device 1 even after lapse of the predetermined period of time (OP303: NO), the process illustrated in FIG. 8 is ended.

In OP304, the control unit 11 identifies the positional relationship between the vehicles 10 based on the vehicle information (the position information) on the other vehicle 10 that is received. In OP305, the control unit 11 causes the touch panel display 113 to display a screen including icons indicating the vehicles 10 arranged according to the identified positional relationship between the vehicles 10 and the music information on each vehicle 10.

In OP306, the control unit 11 determines whether or not the music information on one of the vehicles 10 is selected by a user operation from the screen displayed on the touch panel display 113, as the music to be played back, for example. In the case where the music information on one of the vehicles 10 is selected (OP306: YES), the process proceeds to OP307. In the case where an operation for screen transition or the like is performed or a predetermined period of time elapsed without music information being selected (OP306: NO), for example, the process illustrated in FIG. 8 is ended.

In OP307, the control unit 11 notifies the on-board device 1 that is the transmission source of the music information that is selected of occurrence of an inquiry about the music that is being played back. Then, the process illustrated in FIG. 8 is ended. At the on-board device 1 receiving the notification, a message indicating the notification is displayed on the touch panel display 113 to notify the occupant, for example.

In the second embodiment, the positional relationship to another vehicle 10 in the periphery and the music information on the other vehicle 10 are displayed, and thus, an occupant of the vehicle 10 does not have to input information about the vehicle 10 that is the target, and the on-board device 1 does not have to perform image processing to acquire the vehicle information on the vehicle 10 that is the target. According to the second embodiment, the burden on the occupant of the vehicle 10 or a processing load on the on-board device 1 may be reduced.

In the second embodiment, when a user operation for the music information acquisition request is input from an occupant of the vehicle 10, the music information acquisition request is transmitted to vehicles 10 in the periphery, and information about the music that is being played back in the vehicles 10 in the periphery is collected. Alternatively, the on-board device 1 may transmit the music information and the vehicle information at a predetermined timing through inter-vehicle communication, by multicast or broadcast, for example. The timing of transmitting the music information and the vehicle information is when playback of a piece of music is started or when a piece of music that is being played back is changed, for example. In this case, the on-board device 1 records the music information and the vehicle information received from another on-board device 1 in a predetermined storage area in the memory 102. When a user operation for the music information acquisition request is input from an occupant of the vehicle 10, the on-board device 1 may identify the positional relationships among the vehicles 10 based on the recorded vehicle information on other vehicles 10, and may display the identified positional relationships and the music information on each vehicle 10.

Furthermore, in the second embodiment, the position information is used as the vehicle information, and the positional relationship between the vehicles 10 is identified based on the position information. The positional relationship between the vehicles 10 may also be identified using, instead of the position information, information about directivity of received radio waves of inter-vehicle communication, for example.

Furthermore, for example, each on-board device 1 may transmit, as the vehicle information, information about volume of the music that is being played back, to the on-board device 1 that is the transmission source of the music information acquisition request. In this case, the vehicle 10 where the volume is at or greater than a predetermined value may be extracted to display the music information. This is because, when occupants are listening to music and having a good time, the volume can be assumed to be at or greater than a predetermined value, and by sorting out the vehicles 10 to be displayed based on the volume, an occupant of the vehicle 10 may easily identify the vehicle that is the target. Additionally, the on-board device 1 may transmit at least information about volume, as the vehicle information, and only the vehicle 10 where the volume is at or greater than a predetermined value may be displayed, without identifying the positional relationship between the vehicles 10, when there is input of a user operation for the music information acquisition request.

Third Embodiment

In a third embodiment, the on-board device 1 acquires the music information on another vehicle 10 via a server, without performing inter-vehicle communication. Additionally, in the third embodiment, a description overlapping those of the first embodiment and the second embodiment will be omitted.

Figure 9:
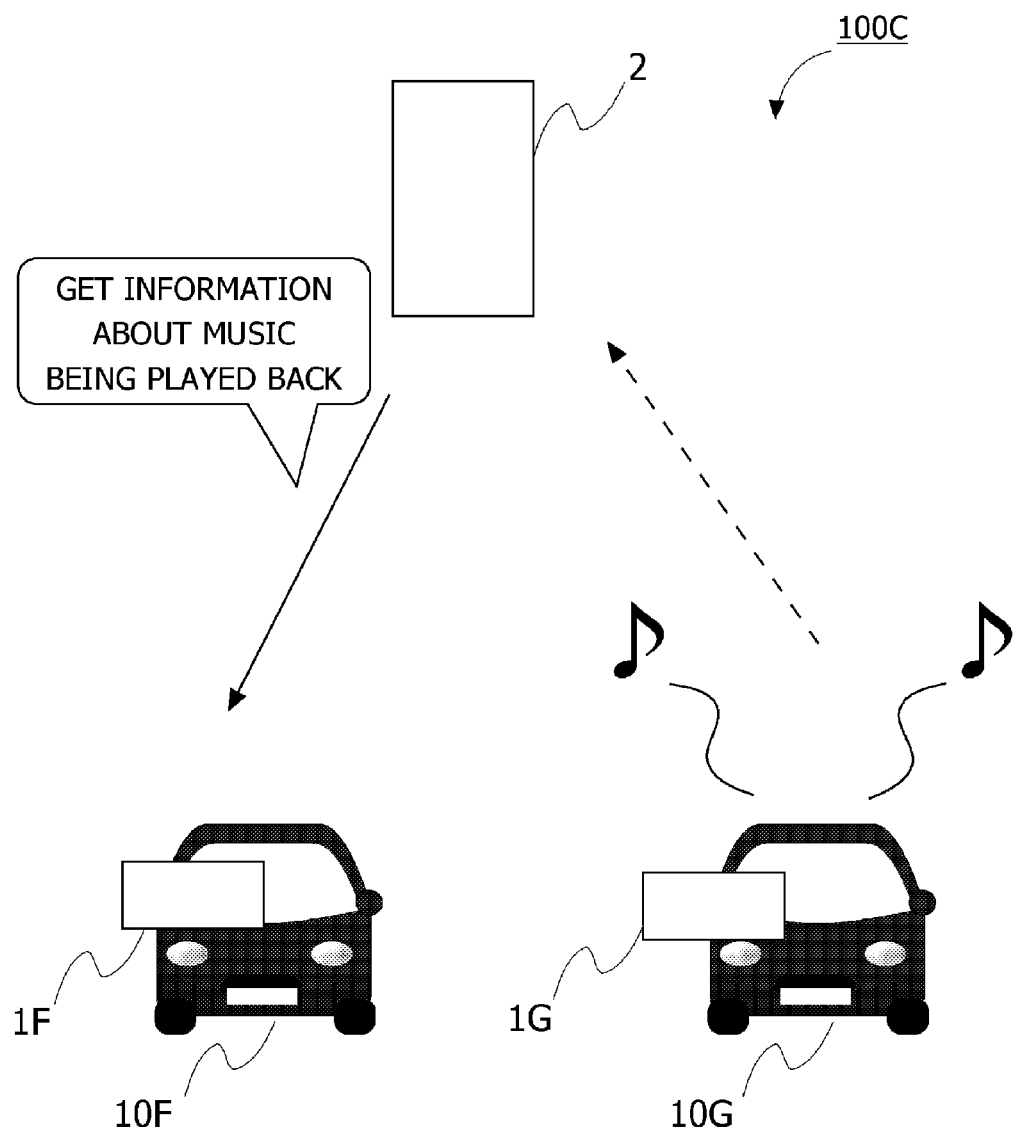
FIG. 9 is a diagram illustrating an example of a system configuration of an in-vehicle-music sharing system according to the third embodiment.

FIG. 9 is a diagram illustrating an example of a system configuration of an in-vehicle-music sharing system 100C according to the third embodiment. The in-vehicle-music sharing system 100C according to the third embodiment includes a server 2 and a plurality of on-board devices 1. The server 2 and each on-board device 1 are capable of communicating with each other over a public line such as the Internet, for example.

In the third embodiment, when a user operation for a music information acquisition request is input to an on-board device 1F from an occupant of a vehicle 10F, for example, the on-board device 1F transmits the music information acquisition request to the server 2 through the communication unit 104. The vehicle information on a vehicle 10G that is the target is transmitted to the server 2 together with the music information acquisition request. Additionally, in the third embodiment, the vehicle information is at least the vehicle number. Furthermore, as in the first embodiment, the vehicle information on the vehicle 10G that is the target may be input by a user operation together with the music information acquisition request, or may be acquired from a captured image from the camera 111. Alternatively, the on-board device 1F may transmit a captured image including the vehicle 10G to the server 2, as the vehicle information on the vehicle 10G that is the target.

When the music information acquisition request and the vehicle information on the vehicle 10G are received from the on-board device 1F, the server 2 transmits the music information acquisition request to an on-board device 1G that is mounted on the vehicle 10G, and acquires the music information on the vehicle 10G from the on-board device 1G. Then, the server 2 transmits the music information on the vehicle 10G to the on-board device 1F, as a response to the music information acquisition request. When the music information on the vehicle 10G is received from the server 2, the on-board device 1F causes the touch panel display 113 to display the music information. In the third embodiment, the server 3 is an example of "information processing device", and the on-board device 1 is an example of "user terminal".

In the third embodiment, the hardware configuration of the on-board device 1 is the same as that in the first embodiment. However, the inter-vehicle communication unit 105 does not have to be provided. The functional configuration of the on-board device 1 according to the third embodiment includes the control unit 11, the audio management unit 12, the image processing unit 13, the vehicle information storage unit 14, and the network communication unit 16.

Figure 10:
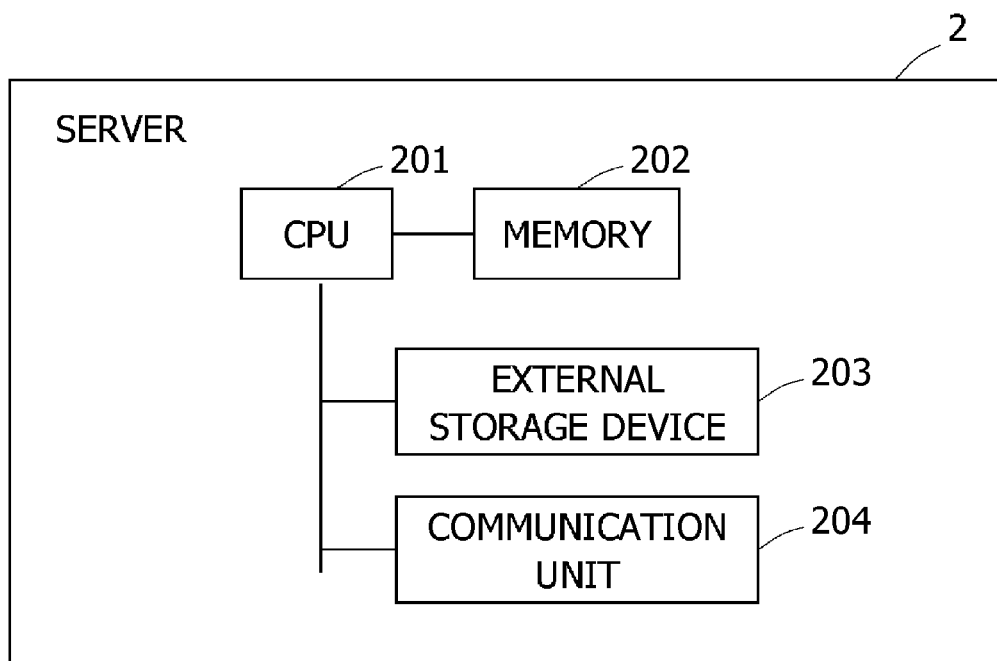
FIG. 10 is an example of a hardware configuration of the server.

FIG. 10 is an example of a hardware configuration of the server 2. The server 2 includes, as the hardware configuration, a CPU 201, a memory 202, an external storage device 203, and a communication unit 204. The CPU 201, the memory 202, and the external storage device 203 are the same as the CPU 101, the memory 102, and the external storage device 103, respectively. For example, the control program for the in-vehicle-music sharing service is stored in the external storage device 203. The communication unit 204 is a wired network interface card for local area network (LAN) or a dedicated line, for example, and connects to a public network such as the Internet through an access network such the LAN. The CPU 201 is an example of "controller".

Figure 11:
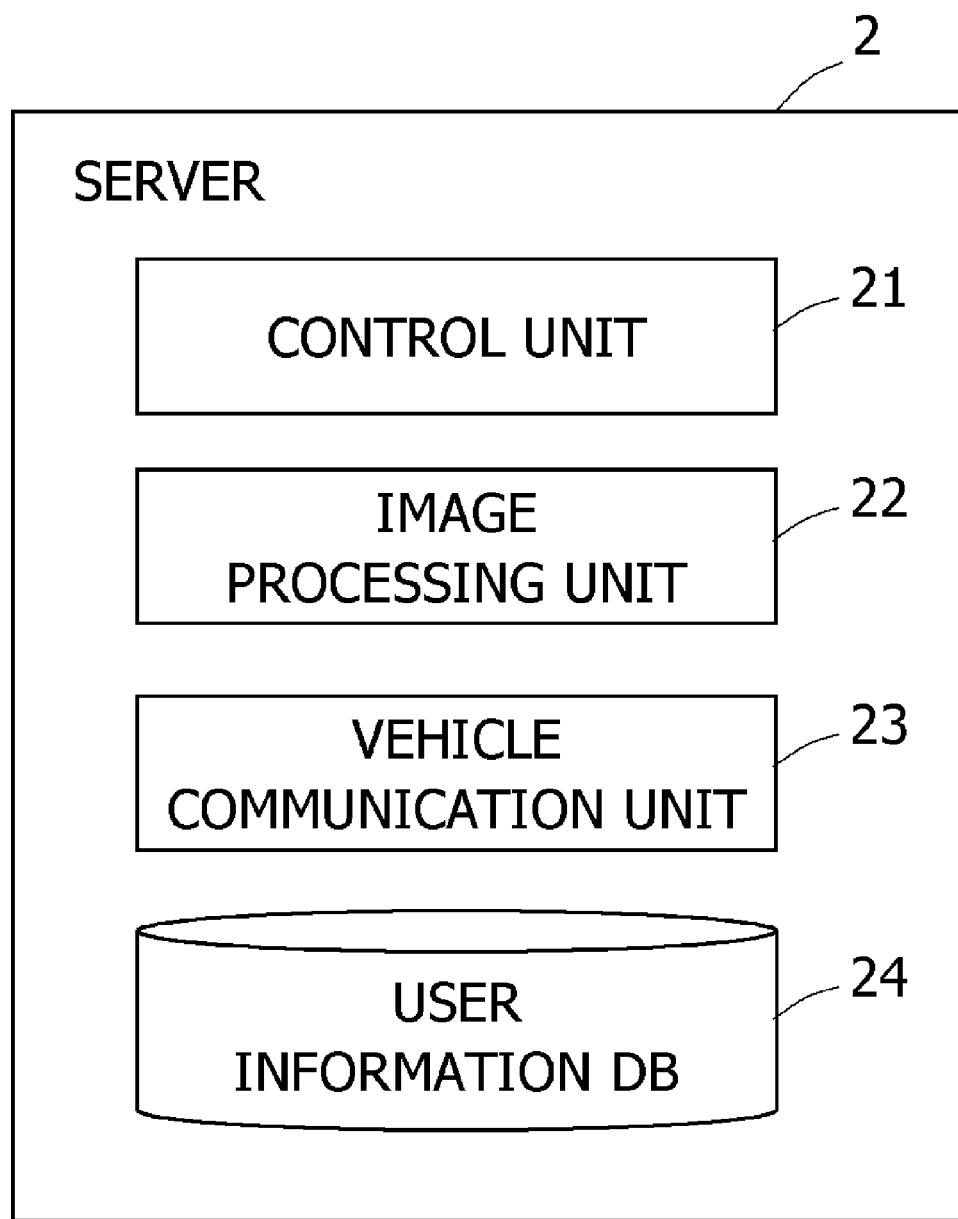
FIG. 11 is an example of the functional configuration of the server.

FIG. 11 is an example of the functional configuration of the server 2. As functional structural elements, the server 2 includes a control unit 21, an image processing unit 22, a vehicle communication unit 23, and a user information DB 24. These functional structural elements are functional structural elements that are implemented by the CPU 201 of the server 2 executing the control program for the in-vehicle-music sharing service, for example.

The vehicle communication unit 23 is an interface for communicating with the on-board device 1 through the communication unit 204. The control unit 21 receives the music information acquisition request and the vehicle information on a vehicle 10 that is the target from the on-board device 1, through the vehicle communication unit 23. The control unit 21 checks whether or not the vehicle 10 that is the target is a vehicle 10 that is registered in the in-vehicle-music sharing system 100C, by referring to the user information DB 24 described later. In the case where the vehicle 10 that is the target is a vehicle 10 that is registered in the in-vehicle-music sharing system 100C, the control unit 21 transmits the music information acquisition request to the on-board device 1 that is mounted on the vehicle 10 in question through the vehicle communication unit 23. In the case where the music information is received from the on-board device 1 mounted on the vehicle 10 that is the target, the control unit 21 transmits, as a response, the music information on the vehicle 10 that is the target, through the vehicle communication unit 23 to the on-board device 1 that is the transmission source of the music information acquisition request. Furthermore, the control unit 21 transmits a notification indicating that there is an inquiry about the music that is being played back, through the vehicle communication unit 23 to the on-board device 1 mounted on the vehicle 10 that is the target.

In the case where a captured image is received from the on-board device 1 together with the music information acquisition request, the control unit 21 requests the image processing unit 22 to perform image processing on the captured image, and acquires the vehicle information on the vehicle 10 that is the target from the captured image.

The image processing unit 22 performs image processing on the image input from the control unit 21, and extracts information about the vehicle 10. In the third embodiment, the vehicle information that is extracted from a captured image by the image processing unit 22 is assumed to be, but not limited to, a vehicle number.

The user information DB 24 is created in a storage area in the external storage device 203, for example. Information about a user who is registered for the in-vehicle-music sharing service is stored in the user information DB 24, for example.

FIG. 12 is an example of a user information table that is stored in the user information DB 24 of the server 2. Information about a user who is registered for the in-vehicle-music sharing service is stored in the user information table. The user information table illustrated in FIG. 12 includes fields of "user ID", "vehicle number" and "address".

Identification information on a user who is registered for the in-vehicle-music sharing service is stored in the field of "user ID". A vehicle number of a vehicle 10 that the user owns, drives or rides is stored in the field of "vehicle number". A communication address of the on-board device 1 that is mounted on the vehicle 10 corresponding to the value in the field of "vehicle number" is stored in the field of "address". The communication address of the on-board device 1 may be any one of an IP address, an email address or an address for push notification, for example.

Additionally, information pieces that are illustrated in FIG. 12 to be held in the user information table are examples and are not restrictive. For example, as the vehicle information on the vehicle 10, information about the vehicle type and vehicle color may be held together with the vehicle number.

Figure 13:
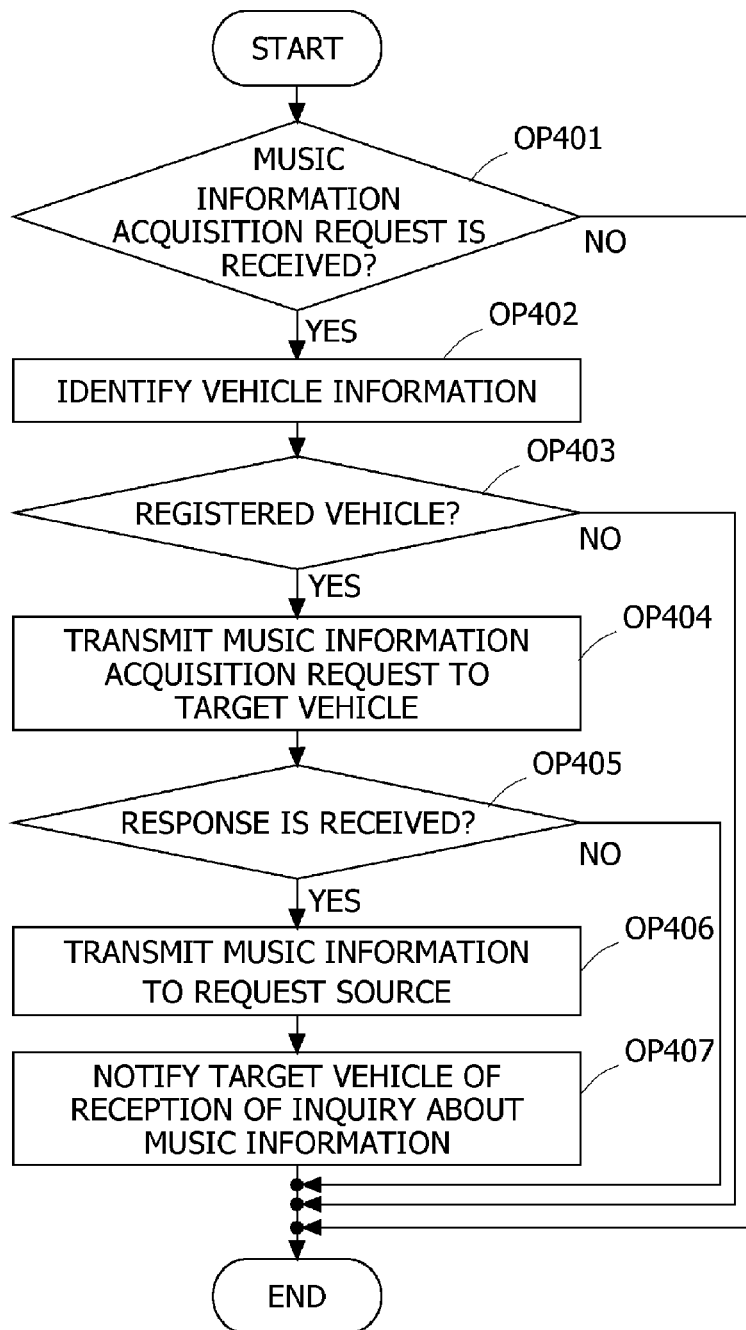
FIG. 13 is an example of a flowchart of a process by the server according to the third embodiment.

FIG. 13 is an example of a flowchart of a process by the server 2 according to the third embodiment. The process illustrated in FIG. 13 is repeatedly performed during operation of the server 2, for example.

In OP401, the control unit 21 determines whether or not a music information acquisition request is received from the on-board device 1 through the vehicle communication unit 23. In the case where a music information acquisition request is received from the on-board device 1 (OP401: YES), the process proceeds to OP402. In the case where a music information acquisition request is not received from the on-board device 1 (OP401: NO), the process illustrated in FIG. 13 is ended.

In OP402, the control unit 21 identifies the vehicle information on the vehicle 10 that is the target. For example, in the case where the vehicle number is received together with the music information acquisition request, the vehicle number that is received is used as the vehicle information on the vehicle 10 that is the target. In the case where an image is received together with the music information acquisition request, the control unit 21 requests the image processing unit 22 to perform image recognition processing on the image, and acquires the vehicle information on the vehicle 10 that is the target from the image.

In OP403, the control unit 21 determines whether or not the vehicle 10 that is the target is registered for the in-vehicle-music sharing service. Determination in OP403 is performed by determining whether or not there is an entry in the user information table in FIG. 12 that matches the vehicle number of the vehicle 10 that is the target, for example. In the case where the vehicle 10 that is the target is registered for the in-vehicle-music sharing service (OP403: YES), the process proceeds to OP404. In the case where the vehicle 10 that is the target is not registered for the in-vehicle-music sharing service (OP403: NO), the process illustrated in FIG. 13 is ended.

In OP404, the control unit 21 transmits the music information acquisition request through the vehicle communication unit 23 to the on-board device 1 mounted on the vehicle 10 that is the target. In OP405, the control unit 21 determines whether or not the music information on the vehicle 10 that is the target is received through the vehicle communication unit 23, as a response from the on-board device 1 mounted on the vehicle 10 that is the target. In the case where the music information on the vehicle 10 that is the target is received (OP405: YES), the process proceeds to OP406. For example, in the case where the music information is not received as a response from the on-board device 1 mounted on the vehicle 10 that is the target even after a predetermined period of time (OP405: NO), the control unit 21 transmits a response indicating an error to the on-board device 1 that is the transmission source of the music information acquisition request, for example, and the process illustrated in FIG. 13 is ended.

In OP406, the control unit 21 transmits the music information of the vehicle 10 that is the target, through the vehicle communication unit 23 to the on-board device 1 that is the transmission source of the music information acquisition request. In OP407, the control unit 21 transmits a notification indicating occurrence of an inquiry about the music that is being played back, to the on-board device 1 mounted on the vehicle 10 that is the target. Then, the process illustrated in FIG. 13 is ended. At the on-board device 1 receiving the notification, a message indicating the notification is displayed on the touch panel display 113 to notify the occupant, for example.

Figure 14:
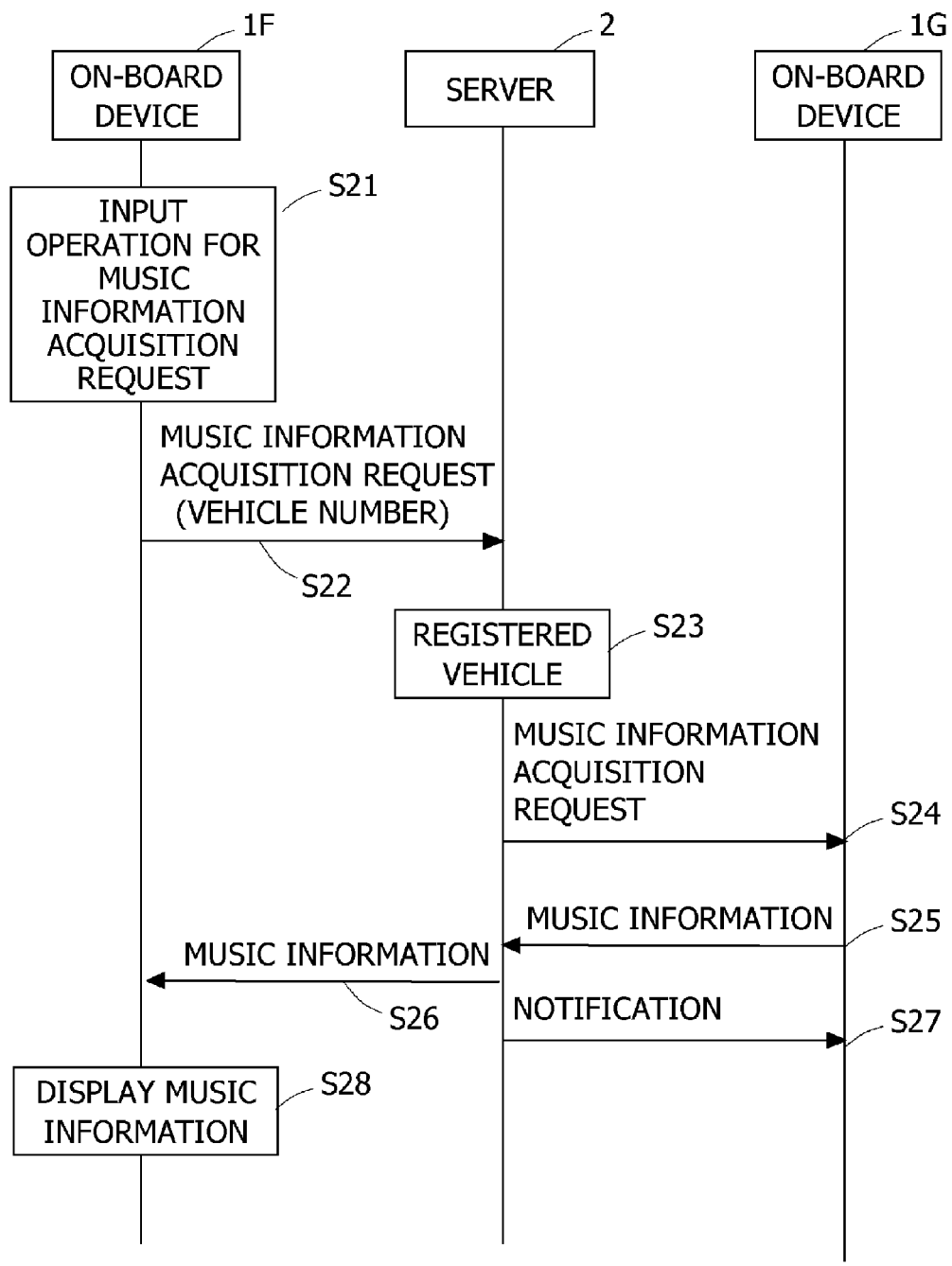
FIG. 14 is a diagram illustrating an example of a sequence of processes of the in-vehicle-music sharing service according to the third embodiment.

FIG. 14 is a diagram illustrating an example of a sequence of processes of the in-vehicle-music sharing service according to the third embodiment. The sequence illustrated in FIG. 14 is a sequence of processes performed among the on-board device 1F, the on-board device 1G, and the server 2, for a case where an occupant of the vehicle 10F in FIG. 9 sees the fun inside the vehicle 10G traveling on an adjacent lane and acquires information about the music that is being played back in the vehicle 10G.

In S21, the on-board device 1F receives input of a user operation for the music information acquisition request from an occupant of the vehicle 10F. It is assumed that the vehicle number of the vehicle 10G that is the target is also input at this time by the occupant. In S22, the on-board device 1F transmits, to the server 2, the music information acquisition request and the vehicle number of the vehicle 10G that is the target, as the vehicle information on the vehicle 10G. The server 2 receives the same (FIG. 13, OP401: YES).

In S23, the server 2 refers to the user information table (FIG. 12), and determines that the vehicle 10G indicated by the vehicle information that is received together with the music information acquisition request is a vehicle that is registered for the in-vehicle-music sharing service (FIG. 13, OP403: YES). In S24, the server 2 transmits the music information acquisition request to the on-board device 1G mounted on the vehicle 10G that is the target (FIG. 13, OP404). The on-board device 1G receives the music information acquisition request from the server 2.

In S25, the on-board device 1G transmits the music information to the server 2, as a response to the music information acquisition request. The server 2 receives the music information from the on-board device 1G (FIG. 13, OP405: YES). In S26, the server 2 transmits the music information on the vehicle 10G received from the on-board device 1G to the on-board device 1F (FIG. 13, OP406). The on-board device 1F receives the music information on the vehicle 10G.

In S27, the server 2 transmits, to the on-board device 1G, a notification indicating occurrence of an inquiry about the music that is being played back (FIG. 13, OP407). In S28, the on-board device 1F causes the music information on the vehicle 10G to be displayed on the touch panel display 113. The occupant of the vehicle 10F may thereafter play back, in the vehicle 10F, the music that is being played back in the vehicle 10G, and information about music may thus be shared between vehicles.

In the third embodiment, the on-board device 1 may acquire information about music that is being played back in another vehicle 10 via the server 2, instead of inter-vehicle communication. Accordingly, even in a case where the on-board device 1 does not include the function for inter-vehicle communication, information about music that is being played back in another vehicle 10 may be acquired.

In the third embodiment, the on-board device 1 is used as a terminal on a user side, but a user terminal such as a smartphone or a tablet terminal may also be used instead of the on-board device 1. In this case, the address of such a user terminal may be registered in the user information table (FIG. 12).

Variation of Third Embodiment

In a variation of the third embodiment, when playback of music is started in a vehicle 10, the server 2 receives notification regarding the music information from the on-board device 1 mounted on the vehicle 10, and thus keeps the music information on each vehicle 10 in advance.

Figure 15:
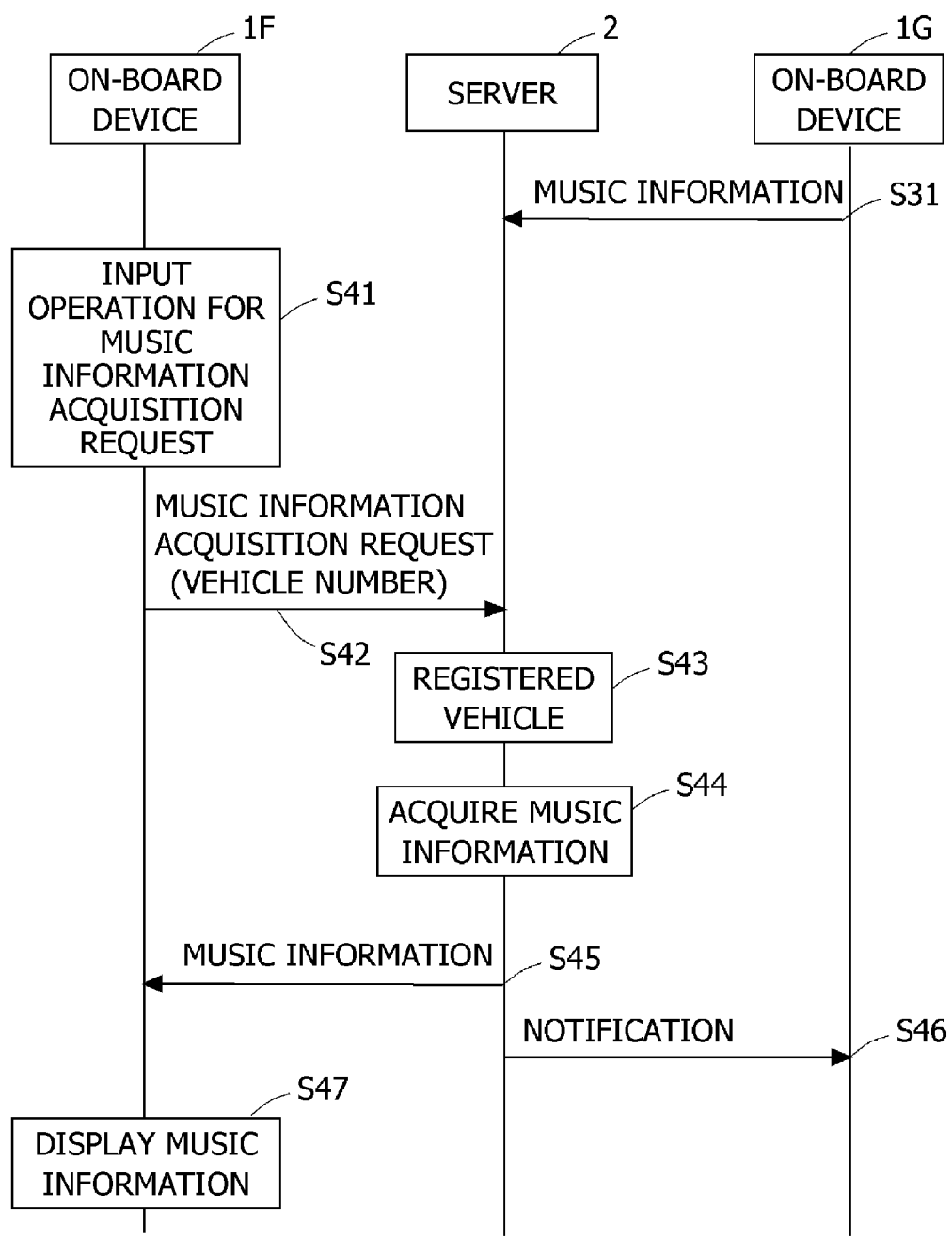
FIG. 15 is a diagram illustrating an example of a sequence of processes of the in-vehicle-music sharing service according to the variation of the third embodiment.

FIG. 15 is a diagram illustrating an example of a sequence of processes of the in-vehicle-music sharing service according to the variation of the third embodiment. The sequence illustrated in FIG. 15 is, as in FIG. 14, a sequence of processes performed among the on-board device 1F, the on-board device 1G, and the server 2, for a case where an occupant of the vehicle 10F in FIG. 9 sees the fun inside the vehicle 10G traveling on an adjacent lane and acquires information about the music that is being played back in the vehicle 10G.

In S31, playback of music is started in the vehicle 10G, and thus, the on-board device 1G transmits the vehicle information and the music information on the subject vehicle 10G to the server 2. The server 2 stores the vehicle information and the music information on the vehicle 10G that are received in a predetermined storage area in the external storage device 203, in association with each other.

In S41, the on-board device 1F receives input of a user operation for the music information acquisition request from an occupant of the vehicle 10F. It is assumed that the vehicle number of the vehicle 10G that is the target is also input at this time by the occupant. In S42, the on-board device 1F transmits, to the server 2, the music information acquisition request and the vehicle number of the vehicle 10G that is the target, as the vehicle information on the vehicle 10G. The server 2 receives the same.

In S43, the server 2 refers to the user information table (FIG. 12), and determines that the vehicle 10G indicated by the vehicle information that is received together with the music information acquisition request is a vehicle that is registered for the in-vehicle-music sharing service. In S44, the server 2 reads and acquires the music information on the vehicle 10G from the predetermined storage area in the external storage device 203. In S45, the server 2 transmits the music information on the vehicle 10G to the on-board device 1F. The on-board device 1F receives the music information on the vehicle 10G.

In S46, the server 2 transmits, to the on-board device 1G, a notification indicating occurrence of an inquiry about the music that is being played back. In S47, the on-board device 1F causes the music information on the vehicle 10G to be displayed on the touch panel display 113. The occupant of the vehicle 10F may thereafter play back, in the vehicle 10F, the music that is being played back in the vehicle 10G, and information about music may thus be shared between vehicles.

In the variation of the third embodiment, the on-board device 1G transmits the music information and the vehicle information to the server 2 at a timing when music is newly played back and at a timing when music that is being played back is changed, for example. Furthermore, the on-board device 1G transmits a notification of end of music playback to the server 2, at a timing when music that is being played back is stopped and at a timing when playback of music that is being played back is ended, for example. When the notification of end of music playback is received, the server 2 erases the music information on the vehicle 10G from the predetermined storage area in the external storage device 203.

According to the variation of the third embodiment, information about music that is being played back in each vehicle 10 is acquired by the server 2 before the music information acquisition request is received, and thus, the speed of response to the music information acquisition request may be increased.

Additionally, in the third embodiment, the in-vehicle-music sharing system 100C includes the server 2 and the on-board devices 1, but the system configuration of the in-vehicle-music sharing system 100C is not limited to such a configuration. For example, the in-vehicle-music sharing system 100C may include a roadside device, and the roadside device may perform some of the processes that are performed by the server 2 according to the third embodiment or the variation of the third embodiment. For example, the on-board device 1 may transmit the music information acquisition request and the captured image, instead of the vehicle information on the vehicle 10 that is the target, to a roadside device in the periphery, and the roadside device that received the music information acquisition request may perform the process of extracting the vehicle information on the vehicle 10 from the captured image. Then, the roadside device may transmit the music information acquisition request and the vehicle information on the vehicle 10 that is the target to the server 2. Additionally, a process that is performed by the roadside device by edge computing is not limited to image processing.

Other Embodiments

The embodiment described above is an example, and the present disclosure may be changed and carried out as appropriate without departing from the gist of the present disclosure.

In the embodiments described above, at the on-board device 1 that is the transmission source of a music information acquisition request, music information on the vehicle 10 that is the target is displayed (output) on the touch panel display 113, but such a case is not restrictive. For example, the music information on the vehicle 10 that is the target may be output by audio from a speaker in the on-board device 1.

In the embodiments described above, the control unit 11 of the on-board device 1 that is the transmission source of a music information acquisition request may automatically play back a music piece indicated by the music information on the vehicle 10 that is the target, with no input of user operation.

In the second embodiment, the on-board device 1 collects the music information on vehicles 10 in the periphery, but instead, the roadside device may collect the music information on vehicles 10 in the periphery, and may transmit the music information on a target vehicle to the on-board device 1 upon reception of a music information acquisition request from the on-board device 1, for example.

In the third embodiment, the on-board device 1 transmits the vehicle information on a vehicle 10 to the server 2 for identification of the target vehicle, and the server 2 identifies the target vehicle based on the received vehicle information, acquires the music information on the target vehicle and transmits the music information to the on-board device 1. Instead, the on-board device 1 may transmit the music information acquisition request and the position information to the server 2, and the server 2 may identify one or a plurality of vehicles 10 existing within a predetermined range from the on-board device 1 based on the received position information, acquire the music information on the identified vehicle(s) 10 and transmit the music information to the on-board device 1. In this case, the vehicle information on the vehicle 10 existing within a predetermined range from the on-board device 1 may also be transmitted to the on-board device 1, together with the music information. The on-board device 1 may cause the touch panel display 113 to display the received music information and the received vehicle information related to one or a plurality of vehicles, and may cause the occupant of the vehicle 10 to select the target vehicle. It thus suffices for the occupant of the vehicle 10 to simply perform operation regarding the music information acquisition request.

The server 2 according to the third embodiment may be a roadside device. In the case where the server 2 is a roadside device, the server 2 and the on-board device 1 may perform road-to-vehicle communication.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing device capable of being placed inside a first vehicle, the information processing device comprising a controller configured to:
   transmit an acquisition request for information about music that is being played back in a vehicle, in relation to a second vehicle among one or a plurality of vehicles existing in a periphery through inter-vehicle communication, by multicast or broadcast;
   receive, through the inter-vehicle communication, first information about music that is being played back in the second vehicle from a first information processing device that is placed inside the second vehicle;
   output the first information;
   transmit information about the second vehicle, together with the acquisition request related to the second vehicle;
   receive, from a second information processing device, information about a target vehicle of the second information processing device and the acquisition request related to the target vehicle of the second information processing device; and
   transmit, to the second information processing device, the second information about music that is being played back in the first vehicle where the information processing device is placed, in a case where the information about the target vehicle of the second information processing device indicates the first vehicle.

2. The information processing device according to claim 1, wherein the controller is further configured to output information indicating that the acquisition request for the information related to the first vehicle is received from the second information processing device.

3. The information processing device according to claim 1, wherein the controller is configured to
acquire information about the second vehicle from a captured image including the second vehicle, and
transmit the information about the second vehicle, together with the acquisition request related to the second vehicle.

4. A non-transitory computer-readable recording medium recorded with a program for causing a computer to operate as the information processing device according to claim 1.

5. A method executed by an information processing device capable of being placed inside a first vehicle, the method comprising:
transmitting an acquisition request for information about music that is being played back in a vehicle, in relation to a second vehicle among one or a plurality of vehicles existing in a periphery through inter-vehicle communication, by multicast or broadcast;
receiving, through the inter-vehicle communication, first information about music that is being played back in the second vehicle from a first information processing device that is placed inside the second vehicle;
outputting the first information,
transmitting information about the second vehicle, together with the acquisition request related to the second vehicle;
receiving, from a second information processing device, information about a target vehicle of the second information processing device and the acquisition request related to the target vehicle of the second information processing device; and
transmitting, to the second information processing device, the second information about music that is being played back in the first vehicle where the information processing device is placed, in a case where the information about the target vehicle of the second information processing device indicates the first vehicle.

* * * * *